(12) United States Patent
Yamazaki

(10) Patent No.: US 11,800,223 B2
(45) Date of Patent: Oct. 24, 2023

(54) FOCUS ADJUSTMENT DEVICE AND FOCUS ADJUSTMENT METHOD

(71) Applicant: Olympus Corporation, Hachioji (JP)

(72) Inventor: Yukie Yamazaki, Tachikawa (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 17/724,209

(22) Filed: Apr. 19, 2022

(65) Prior Publication Data
US 2022/0360721 A1    Nov. 10, 2022

(30) Foreign Application Priority Data
May 10, 2021    (JP) .................................. 2021-079868

(51) Int. Cl.
*H04N 23/67* (2023.01)

(52) U.S. Cl.
CPC ......... *H04N 23/675* (2023.01); *H04N 23/672* (2023.01)

(58) Field of Classification Search
CPC ........................... H04N 23/675; H04N 23/672
See application file for complete search history.

(56) References Cited

U.S. PATENT DOCUMENTS

| | | |
|---|---|---|
| 2009/0185798 A1 | 7/2009 | Tsukada |
| 2012/0057786 A1* | 3/2012 | Yano ..................... H04N 23/675 382/170 |
| 2013/0107961 A1* | 5/2013 | Yamori .................. H04N 19/40 375/E7.243 |
| 2014/0334683 A1* | 11/2014 | Masuda ............... H04N 23/611 382/103 |
| 2018/0176453 A1 | 6/2018 | Yamazaki |
| 2019/0141254 A1* | 5/2019 | Kawarada ............ H04N 23/671 |
| 2020/0283721 A1 | 9/2020 | Minami |

FOREIGN PATENT DOCUMENTS

JP    2009-210815 A    9/2009

* cited by examiner

*Primary Examiner* — Michael E Teitelbaum
(74) *Attorney, Agent, or Firm* — John C. Pokotylo; Pokotylo Patent Services

(57) ABSTRACT

A focus adjustment device, that provides a plurality of detection areas in an imaging region, repeatedly generates ranging values for a physical object in the detection areas, and performs focus adjustment for the physical object based on the ranging values, including a processor that has a statistical processing section, a movement state estimating section, a prediction section, and a control section, wherein the statistical processing section subjects ranging values of the plurality of detection areas to statistical processing, the movement state estimating section calculates representative values that contain statistical dispersion based on the statistical processing, and estimates movement state of the physical object based on time-series change in the representative value, the prediction section predicts focal position regarding the physical object based on the movement state that has been estimated, and the control section performs focus adjustment based on the focal position that has been predicted.

17 Claims, 15 Drawing Sheets

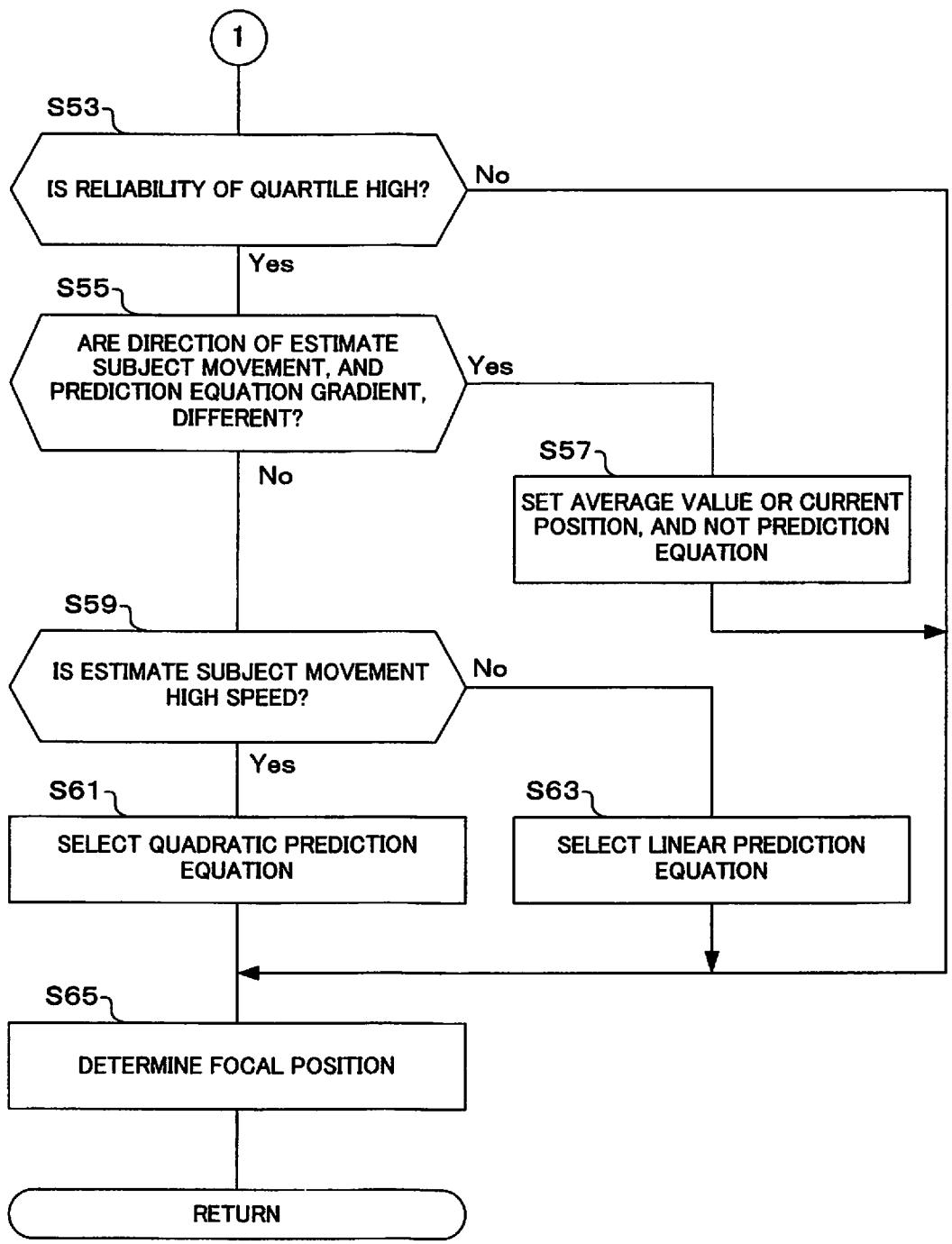

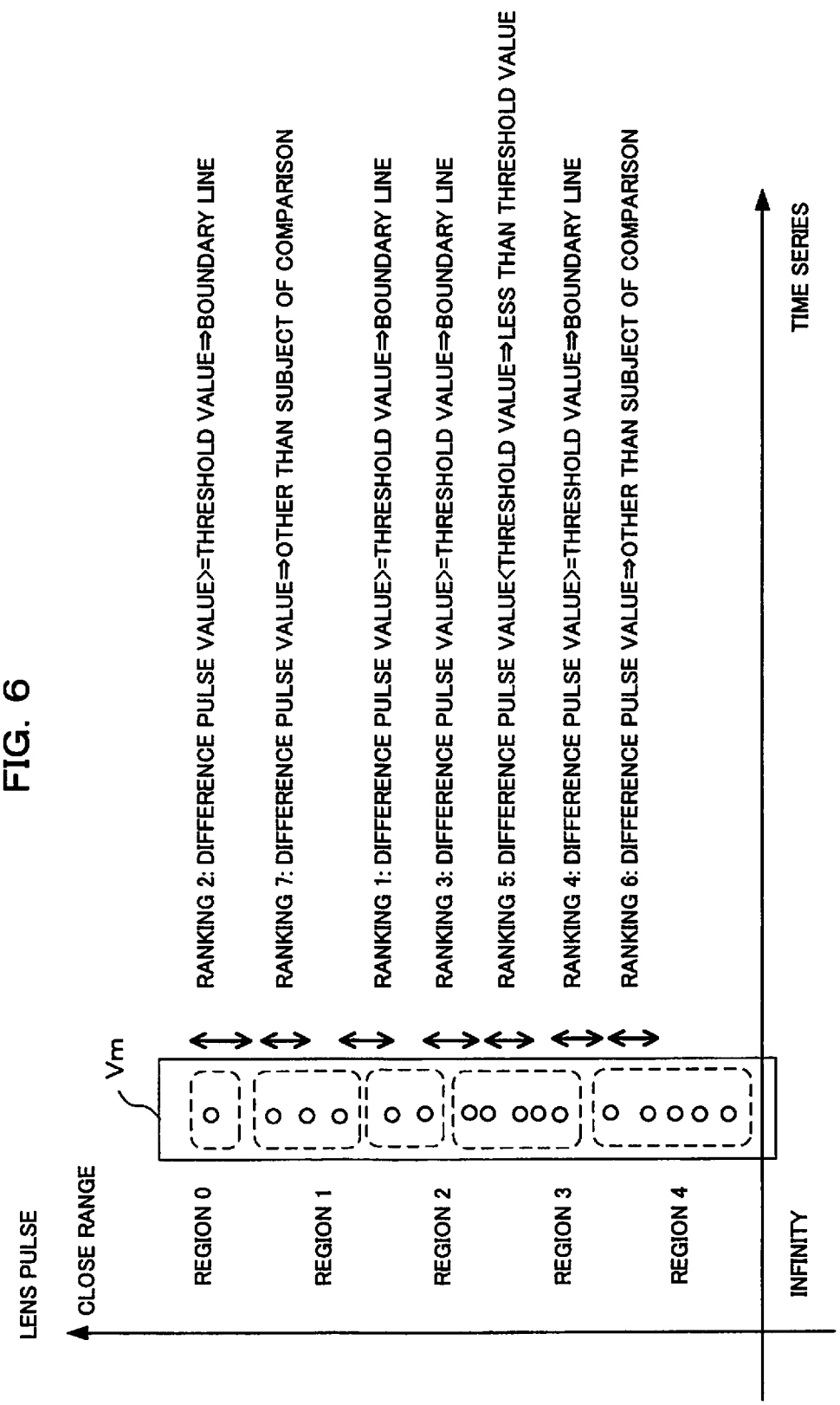

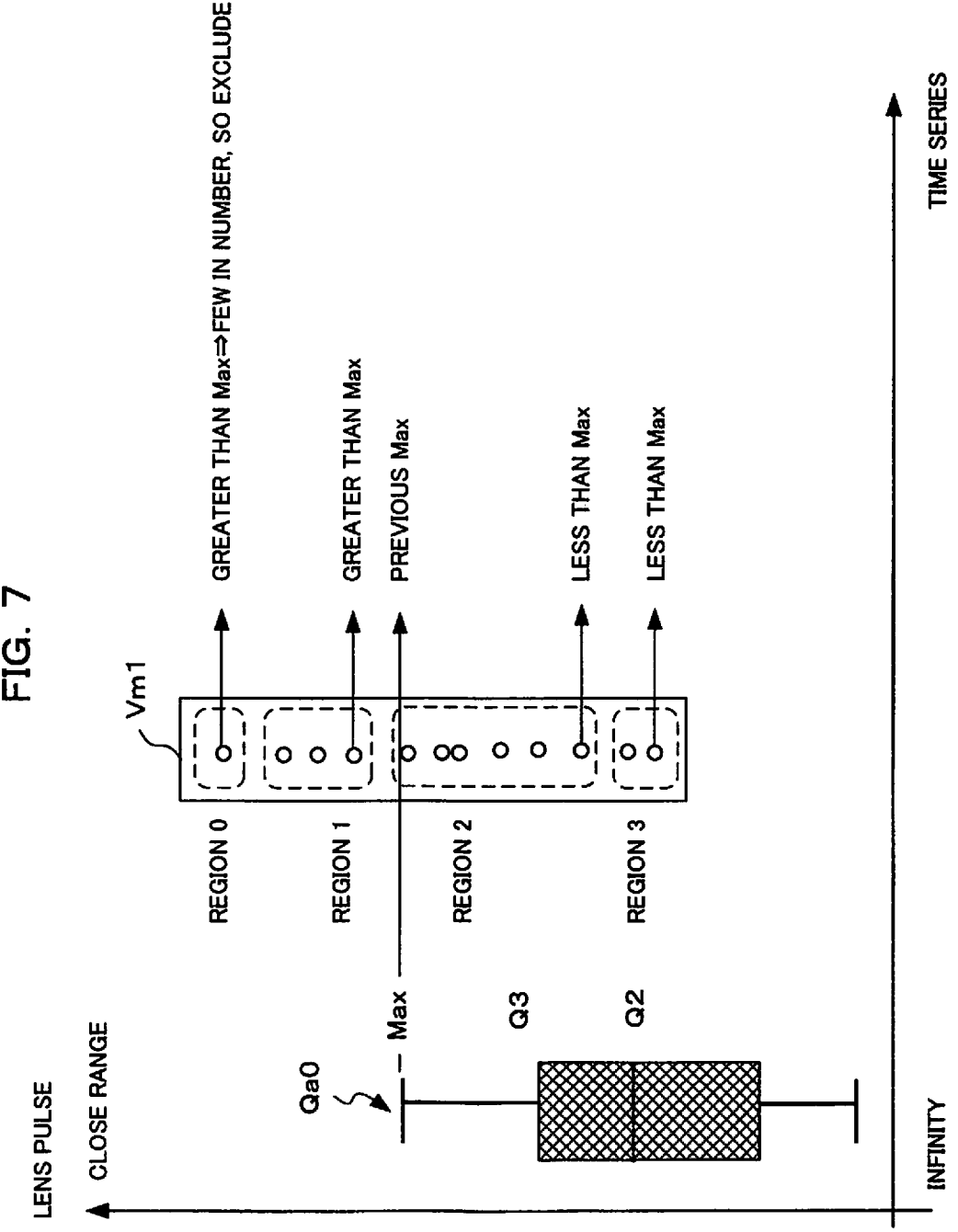

FIG. 10

FREQUENCY DISTRIBUTION TABLE
(HISTOGRAM)

| CLASS [F δ] | INTERQUARTILE RANGE: IQR | | RANGE: max−min | |
|---|---|---|---|---|
| | NUMBER OF TIMES | RELATIVE FREQUENCY | NUMBER OF TIMES | RELATIVE FREQUENCY |
| a~b | 6 | 0.4 | 1 | 0.67 |
| b~c | 6 | 0.4 | 5 | 0.333 → FIRST MOST FREQUENT VALUE |
| c~d | 2 | 0.133 | 3 | 0.2 → SECOND MOST FREQUENT VALUE |
| d~e | 1 | 0.067 | 2 | 0.133 |
| e~f | 0 | 0 | 2 | 0.133 |
| LARGER THAN f | 0 | 0 | 2 | 0.133 |
| TOTAL | 15 | 1 | 15 | 1 |

⇒ FOR X SECONDS FROM NEWEST

FOCUS ADJUSTMENT DEVICE AND FOCUS ADJUSTMENT METHOD

CROSS-REFERENCE TO RELATED APPLICATIONS

Benefit is claimed, under 35 U.S.C. § 119, to the filing date of prior Japanese Patent Application No. 2021-079868 filed on May 10, 2021. This application is expressly incorporated herein by reference. The scope of the present invention is not limited to any requirements of the specific embodiments described in the application.

BACKGROUND OF THE INVENTION

1. Field of the Invention

The present invention relates to a focus adjustment device and a focus adjustment method that have a plurality of areas for ranging, repeatedly obtain ranging values for a physical object, and perform focus adjustment based on the ranging values.

2. Description of the Related Art

With an automatic focus adjustment device such as a camera, in order to focus on a subject that is moving detection of defocus amount goes on continuously, and moving body estimation computation is performed using history information of that defocus amount, to predict position of a subject in the future (at the time of actual shooting). However, there are cases where it is not possible to predict future position of a subject with good accuracy, due to various factors (for example, hand shake of the photographer, framing error, crossing subject, prediction computation error, etc.). It should be noted that with actual shooting, when the photographer presses the release button fully to instruct shooting, shooting is actually performed after time delays such as shutter lag etc.

In order to address the above described drawbacks, a focus adjustment device that continuously detects defocus amount, performs moving body estimation computation using history information of the defocus amount, and predicts future position of a subject, is disclosed in, for example, Japanese patent laid-open No. 2009-210815 (hereafter referred to as "patent publication 1"). With this focus adjustment device, in a case where it has been determined that defocus amount of ranging areas that have been selected are discontinuous in time, ranging areas in which defocus amounts are continuous are searched for based on defocus amounts of a plurality of ranging areas other than the ranging areas that have been selected. Then, a ranging area at the closest range is selected again from ranging areas for which defocus amount is continuous, and moving body estimation computation is performed using the defocus amount of the ranging area that has been selected again.

Also, a focus adjustment device that divides a plurality of areas into a plurality of groups in accordance with a specified range based on variation in focus state of the plurality of areas, selects an appropriate group from the plurality of groups depending on a main subject, and performs focus adjustment based on focus state belonging to the group that has been selected, is disclosed on Japanese patent laid-open No. 2009-175310 (hereafter referred to as "patent publication 2"). However, there is no description in this patent publication 2 of AF (autofocus) that performs moving body prediction computation.

Defocus amount that has been detected using a phase difference AF method includes a certain degree of ranging error caused by degradation of degree of similarity of focus detection signals for left and right (or upper and lower) pupils due to low light or low contrast conditions etc., and slight offset of in-focus position due to optical characteristics, etc. As a ranging area selection method, generally, a defocus amount detecting the closest range is selected. However, in a case where ranging error is included in the defocus amount for the closest range, or in a case where an incorrect ranging area is selected if moving body estimation computation is performed using history information, as disclosed in patent publication 1, accuracy of the moving body estimation computation is lowered. Also, with the method disclosed in patent publication 2, if a subject is moving it is easy for an incorrect ranging area to be selected, and for focus adjustment precision to be lowered.

SUMMARY OF THE INVENTION

The present invention provides a focus adjustment device and focus adjustment method that can improve precision of moving body estimation computation for a physical object that is moving.

A focus adjustment device of a first aspect of the present invention provides a plurality of detection areas in an imaging region formed by an optical system, repeatedly generates ranging values for a physical object in the detection areas, and performs focus adjustment for the physical object based on the ranging values, and comprises a processor that has a statistical processing section, a movement state estimating section, a prediction section, and a control section, wherein the statistical processing section subjects ranging values of the plurality of detection areas to statistical processing, the movement state estimating section calculates representative values that contain statistical dispersion based on the statistical processing, and estimates movement state of the physical object based on time-series change in the representative values, the prediction section predicts focal position for the physical object based on the movement state that has been estimated, and the control section performs focus adjustment based on the focal position that has been predicted.

A focus adjustment method of a second aspect of the present invention provides a plurality of detection areas in an imaging region formed by an optical system, repeatedly generates ranging values for a physical object in the detection area, and performs focus adjustment for the physical object based on the ranging values, and comprises subjecting ranging values of the plurality of detection areas to statistical processing, calculating representative values that contain statistical dispersion based on the statistical processing, and estimating movement state of the physical object based on time-series change in the representative values, predicting focal position regarding the physical object based on the movement state that has been estimated, and performing focus adjustment based on the focal position that has been predicted.

A non-transitory computer-readable medium of a third aspect of the present invention, storing a processor executable code, which when executed by at least one processor, the processor being arranged in a focus adjustment device that is provided with a plurality of detection areas in an imaging region formed by an optical system, and that detects ranging values of a physical object in the detection areas to perform focus adjustment for the physical object, the focus adjustment method comprising subjecting ranging values of the plurality of detection areas to statistical processing, calculating representative values that contains statistical dispersion based on the statistical processing, and estimating movement state of the physical object based on time-series change in the representative values, predicting focal position regarding the physical object based on the movement state that has been estimated, and performing focus adjustment based on the focal position that has been predicted.

BRIEF DESCRIPTION OF THE DRAWINGS

FIG. 5A and FIG. 5B are flowcharts showing operation of focal position prediction processing of the camera of one embodiment of the present invention.

FIG. 6 is a drawing for describing division of data relating to ranging of target ranging areas into regions, in the camera of one embodiment of the present invention.

FIG. 7 is a drawing for describing the fact that a small number of regions at the close-up end are removed, in the camera of one embodiment of one embodiment of the present invention.

FIG. 10 is a table showing frequency distribution of interquartile range, in the camera of one embodiment of the present invention.

DETAILED DESCRIPTION OF THE PREFERRED EMBODIMENTS

One embodiment of the present invention will be described in the following. The present invention can be applied to a focus adjustment device if the device has a plurality of detection areas (ranging areas) in an imaging region, repeatedly calculates ranging values of an object in the plurality of detection areas to acquire ranging values, and performs focus adjustment for the object. Here, description will be given of an example where the present invention has been applied to a digital camera (called a "camera"), as one embodiment.

This camera has an imaging section, with a subject image, which is an object, being converted to image data by this imaging section, and the subject image being subjected to live view display on a display section arranged on the rear surface etc. of the camera body based on this converted image data. A photographer determines composition and photo opportunity by looking at the live view display. At the time of a release operation image data is stored in a storage medium. Image data that has been stored in the storage medium can be subjected to playback display on the display section if playback mode is selected.

Figure 3:
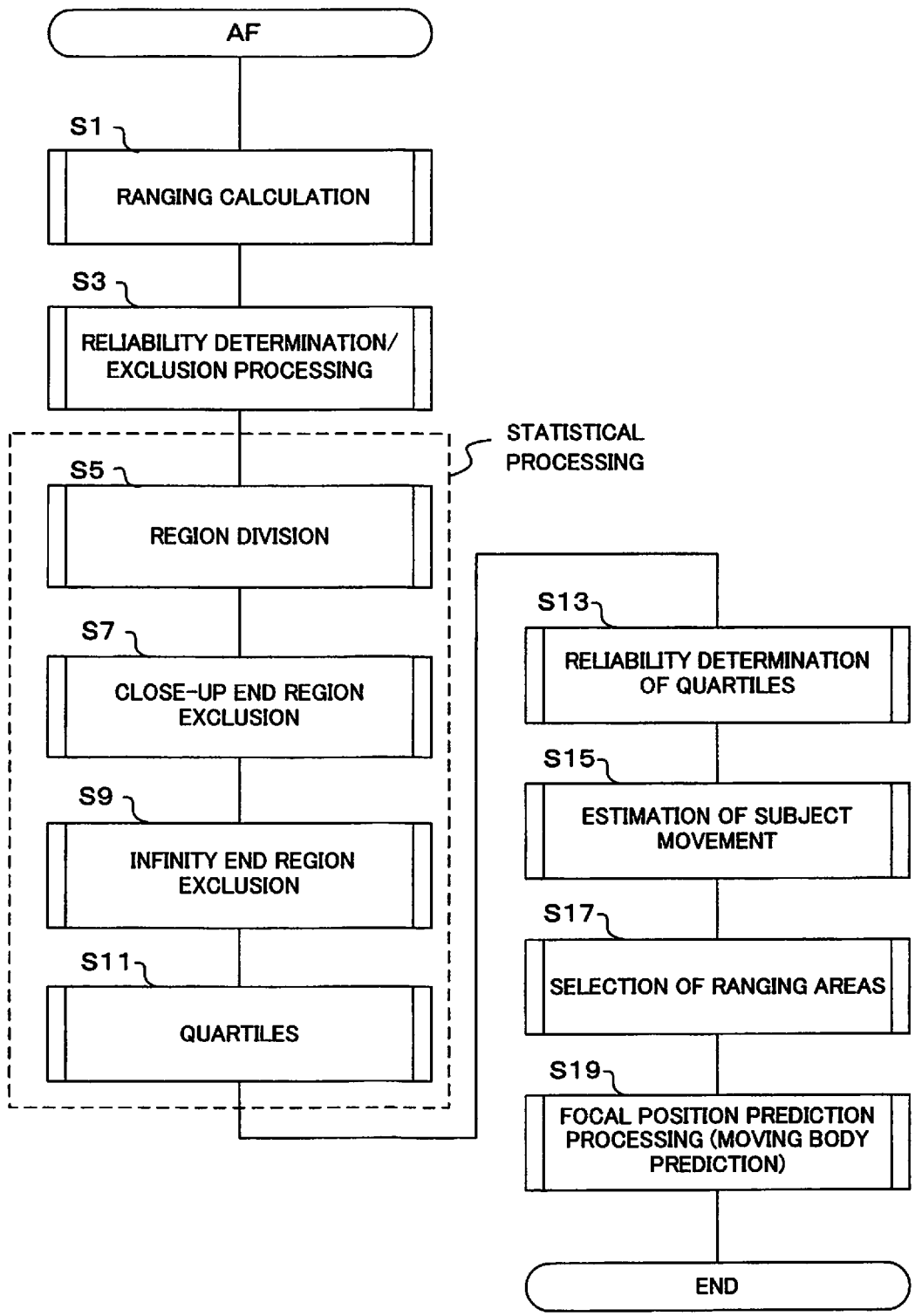
FIG. 3 is a flowchart showing AF operation of the camera of one embodiment of the present invention.

Also, it is possible to detect ranging values for each of a plurality of ranging areas using pixel data that is output by the imaging section of this camera (refer, for example, to S1 in FIG. 3). A statistical value representing dispersion in ranging values of a plurality of ranging areas is then calculated, and representative values that include the statistical value representing this dispersion are obtained (refer, for example, to S5 to S11 in FIG. 3). Movement of the subject is estimated based on time series change in the representative values (refer, for example, to S15 in FIG. 3). It should be noted that the imaging section reads out pixel data at time intervals corresponding to a specified frame rate, and outputs the pixel data to the AF calculation section.

As a statistical method for obtaining the above-described statistical values representing dispersion, in this embodiment quartiles are used. As the representative values including the statistical value representing dispersion, a first quartile (Q1), second quartile (Q2), third quartile (Q3), and interquartile range (Q1 to Q3) etc. are used (refer, for example to S11 in FIG. 3, and to FIG. 9, and in the following Q1, Q2, and Q3 will be called quartiles). These quartiles are calculated based on ranging values of a plurality of ranging areas for every frame that has been imaged. If quartiles have been calculated for every frame, differences between associated quartiles Q1, Q2 and Q3 between frames are calculated (refer, for example, to FIG. 11). Further, movement state of the subject is estimated based on change in differences between associated quartiles Q1, Q2, and Q3 across a plurality of frames (refer, for example, to S15 in FIG. 3, and to FIG. 12). This estimated subject movement state is reflected at the time of moving body estimation computation (refer, for example, to S19 in FIG. 3, and to FIG. 5A and FIG. 5B). For example, subject movement state is reflected in the order of the moving body prediction equation and number of items of history information etc. when performing moving body estimation computation.

Figure 1:
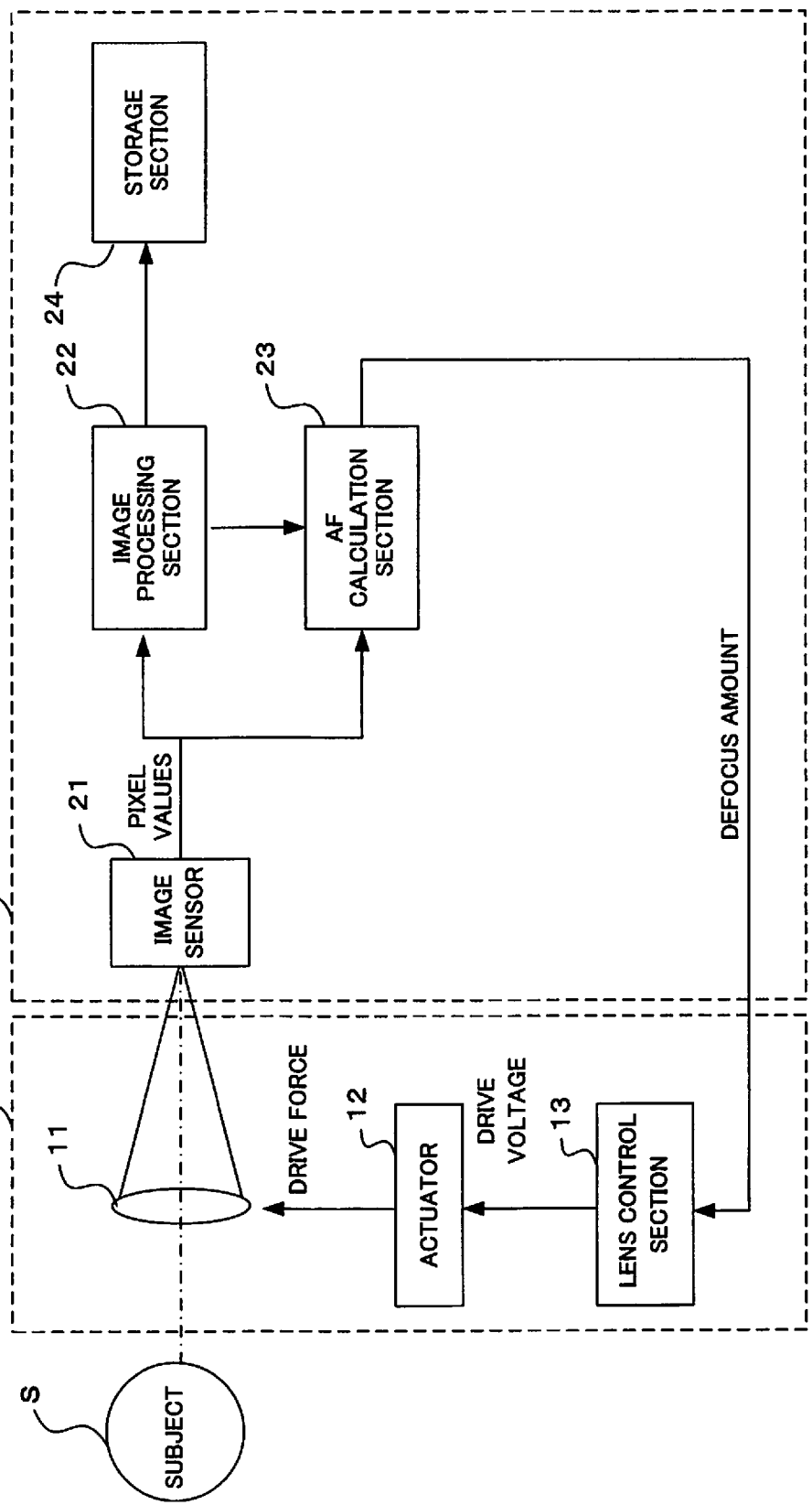
FIG. 1 is a block diagram mainly showing the electrical structure of a camera of one embodiment of the present invention.

One embodiment of the present invention will be described in the following using the drawings. FIG. 1 is a block diagram mainly showing the electrical structure of the camera of this embodiment. The camera relating to this embodiment comprises an interchangeable lens 10 and a camera body 20. With this embodiment, the interchangeable lens 10 and a camera body 20 are configured separately, but they may also be constructed integrally, like a general compact camera. Also, the camera of this embodiment receives light of a subject image that has been subjected to pupil division by a photographing lens, that includes a focus lens, using an image sensor, subjects the subject image to photoelectric conversion to generate image data, and performs a focus adjustment operation based on the image data.

A photographing lens 11 is arranged inside the interchangeable lens 10. The photographing lens 11 has a plurality of optical lenses, including a focus lens, and forms an optical image of a subject S. An aperture is arranged within the interchangeable lens 10, in the optical path of the photographing lens 11, and an aperture opening detection section for detecting opening of this aperture is also provided within the interchangeable lens 10. An actuator 12 and a lens control section 13 are also provided inside the interchangeable lens 10.

The lens control section 13 is one or a plurality of processors having a CPU (Central Processing Unit), peripheral circuits, and a memory that stores programs etc. The lens control section 13 receives a defocus amount (or corresponding lens pulse value) from an AF calculation section 23 inside the camera body 20, and performs control of the actuator 12 based on these items of information. The actuator 12 moves the focus lens within the photographing lens 11 in the optical axis direction to perform focusing. It should be noted that position of the focus lens is detected using a lens position detection section (not illustrated), and lens position is transmitted by means of a communication section (not illustrated) to the camera body 20.

An image sensor 21, image processing section 22, AF calculation section 23, and storage section 24 are provided within the camera body 20. The image sensor 21 is arranged on the optical axis of the photographing lens 11, close to a position where a subject image is formed.

The image sensor 21 is provided with a plurality of pixels, and each pixel has a photoelectric conversion section for converting the subject image (optical image) to an electrical signal. Also, there are two types of the above-described pixels, namely image pixels and focus detection pixels. Incident direction of light flux that is incident on the focus detection pixels (also called phase difference detection pixels) is restricted. On the other hand, light flux that is incident on the image pixels is restricted less than for the focus detection pixels. These pixels are arranged two-dimensionally. Also, pixels of the image sensor are arranged so as to form a plurality of focus detection pixel lines (focus detection areas).

As the previously described focus detection pixels, focus detection pixels (for example, left opening focus detection pixels) are provided to receive light of one direction, resulting from having divided light that is incident from the photographing lens 11 into two directions (left and right, or up and down) by pupil division, and focus detection pixels (for example, right opening focus detection pixels) are provided to receive light of the other direction. Pairs are then formed of focus detection pixels receiving light of the one direction and of the other direction. For example, a plurality of pixel data of a plurality of left and right opening focus detection pixels constitute pairs for phase difference in a left-right direction. The image sensor 21 functions as an image sensor that has a plurality of pixel sections that subject light flux from the subject, that has passed through the photographing lens, to pupil-division, and that are constituted by pairs of pixels that receive the light that has been subjected to pupil-division, and outputs pairs of pixel signal lines corresponding to pupil division resulting from photoelectric conversion of the plurality of pixel sections.

Restriction of the incident direction of light flux that is incident on the pixels may also be realized using focus detection pixels, and a positional relationship between micro lens that are arranged on the surface of those focus detection pixels, and the photographing lens 11. Specifically, it is possible to restrict incident direction of the light flux, by displacing position of the focus detection pixels with respect to the optical axis of a micro lens. The image sensor 21 that adopts this type of structure functions as an image sensor that has a plurality of pixel sections made up of a plurality of pixels that are paired in accordance with a single micro lens, and that outputs a plurality of pixel signals in accordance with pupil-division resulting from photoelectric conversion by the plurality of pixel sections.

The image sensor 21 outputs pixel data (pixel values) that has been output from the focus detection pixels and the image pixels to the image processing section 22 and the AF calculation section 23. The image processing section 22 has an image processing circuit, is input with pixel data from the imaging pixels, among the pixel data, and performs image processing for a live view display image and for a storage image. The image processing section 22 also outputs image data, that has been processed for storage, to the storage section 24. The storage section 24 is an electrically rewritable nonvolatile memory, to which image data for storage is input and stored. The image processing section 22 also detects a face of a subject using pixel data and outputs a central coordinate position of this face, and detects organs such as eyes of the face and outputs a specified coordinate position of this organ (refer to the face detection section 22a which will be described later). The image processing section 22 also performs subject tracking using pixel data (refer to the tracking section 22b which will be described later).

The AF calculation section 23 is one or a plurality of processors having a control circuit such as a CPU (Central Processing Unit), peripheral circuits, and a memory that stores programs etc. The AF calculation section 23 is input with pixel data from the focus detection pixels, among pixel data, and performs AF calculation based on phase difference detection. At the time of AF calculation, a ranging area (focus detection area) corresponding to position of the focus detection pixels is set based on central coordinate position and specified coordinate position that have been acquired from the image processing section 22. The AF calculation section 23 then calculates defocus amount and contrast evaluation value for this ranging area that has been set. The focus lens within the photographing lens 11 is driven to an in focus position based on this defocus amount and contrast evaluation value that have been calculated. The AF calculation section 23 acts in cooperation with the lens control section 13 to function as a control section that performs focus adjustment based on focal position that has been predicted. The detailed structure of the AF calculation section 23 will be described later using FIG. 2.

Next, details of the AF calculation section 23 will be described using FIG. 2. The AF calculation section 23 comprises one or a plurality of processors, as was described previously, and has functions as a statistical processing section, movement state estimating section, prediction section, and control section. Specifically, each of the above-described sections may be part of the processor. Also, the AF calculation section 23 has an AF ranging point setting section 33, phase difference pixel generating section 34, first AF calculation section 35, second AF calculation section 36, and focal position prediction section 37, and each of the sections may be realized by hardware circuits within the processor, and programs executed by a CPU.

Figure 2:
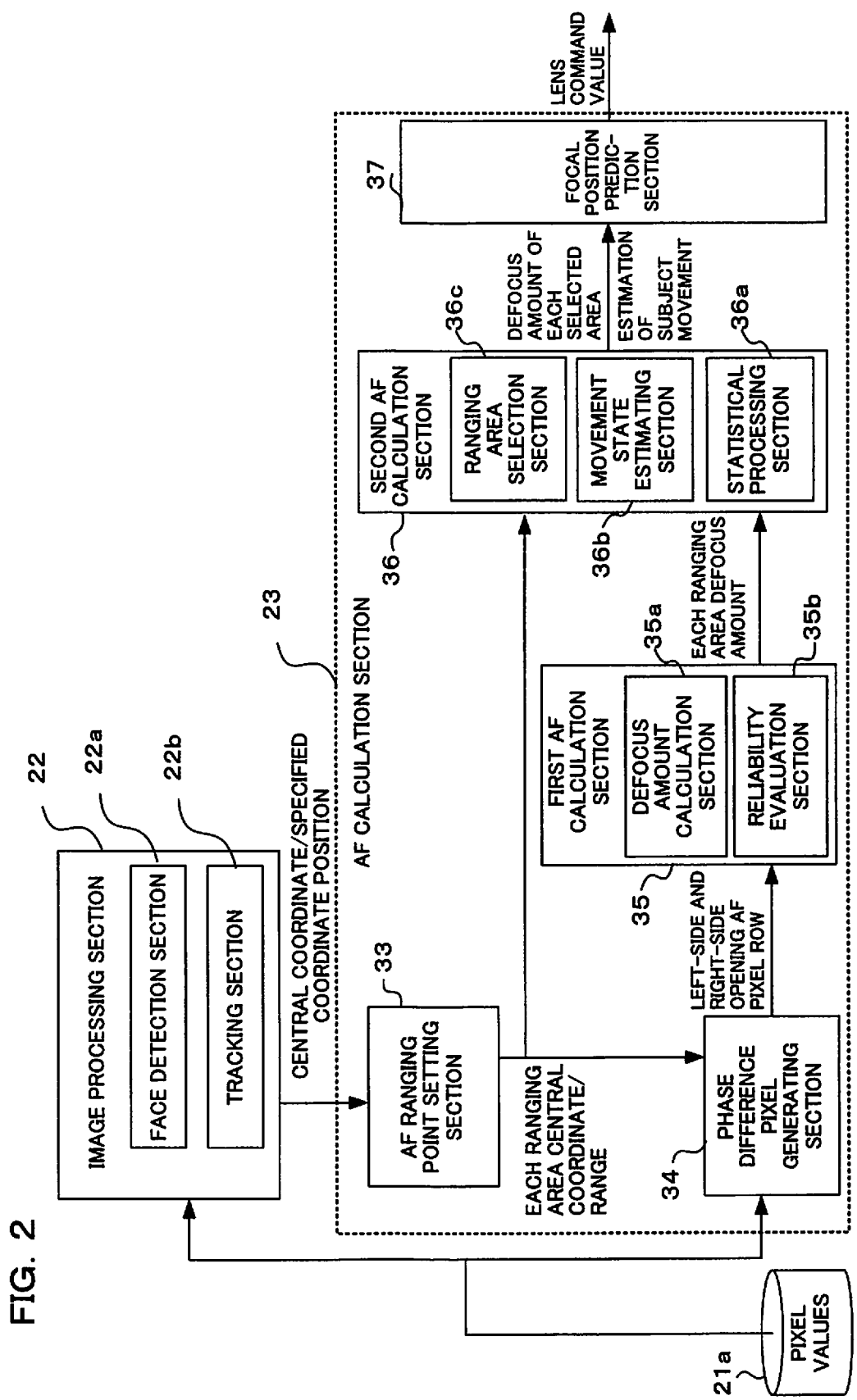
FIG. 2 is a block diagram showing detail of an AF calculation section of a camera of one embodiment of the present invention.

The pixel data 21a in FIG. 2 is pixel data (pixel values) that has been output from the image sensor 21, and is temporarily stored in SDRAM (Synchronous Dynamic Random Access Memory) or the like. As was described previously, imaging pixels and focus detection pixels (phase difference detection pixels) are provided in the image sensor 21, with the image processing section 22 processing mainly pixel data from the imaging pixels, and the AF calculation section 23 processing pixel data from the focus detection pixels.

A face detection section 22a having a face detection circuit is provided within the image processing section 22. This face detection section 22a determines whether or not there is a face within a subject image based on pixel data of the imaging pixel from the image sensor 21. If the result of this determination is that a face is contained within the subject image, the face detection section 22a detects position (central coordinate position) and size etc. of the face. Further, detection of organs such as the right eye, left eye, nose etc. is also performed, and specified coordinate position of those organs is also detected. Central coordinates and/or specified coordinate positions that have been detected by the face detection section 22a are output to an AF ranging point setting section 33 within the AF calculation section 23.

A tracking section 22b having a tracking circuit is also provided within the image processing section 22. This tracking section 22b performs tracking of a subject based on pixel data of imaging pixels from the image sensor 21. The tracking section 22b compares pixel data, every time pixel data is output from the image sensor 21, based on, for example, position of a face that has been detected by the face detection section 22a, position of the subject that has been designated by the photographer, or position of a subject that is at the closest distance within a plurality of ranging areas. Based on the results of this comparison, the tracking section 22b detects where the same subject has moved to within the imaging region (photographing screen), and in this way performs tracking. Central coordinate and/or specified coordinate positions within a tracking target that has been detected by the tracking section 22b are output to an AF ranging point setting section 33 within the AF calculation section 23.

The AF ranging point setting section 33 that is provided within the AF calculation section 23 sets AF ranging point (ranging area) corresponding to the central coordinate position and/or specified coordinate position that has been detected by the face detection section 22a or the tracking section 22b, based on that central coordinate position and/or specified coordinate position. A plurality of ranging points are associated with imaging regions (photographing screen) of the image sensor 21 beforehand, and ranging points at the central coordinate position and/or specified coordinate position, or ranging points that are close to these coordinate positions, among the plurality of ranging points, are set, and central coordinates of each ranging point that has been set are output to the phase difference pixel generating section 34 and the second AF calculation section 36. It should be noted that ranging points can also be set manually by the user.

A focus detection pixel (phase difference pixel) generating section 34 is input with phase difference pixel data for focus detection pixel lines, within the pixel data 21a. The focus detection pixel generating section 34 is also input with central coordinates of ranging (FOCUS detection) areas etc. from the AF ranging point setting section 33, and generates phase difference pixel data lines corresponding to, or close to, an AF ranging point that has been set from among phase difference pixel data. The generation of phase difference pixel data lines by the focus detection pixel generating section 34 is not limited to only areas that belong to central coordinates of a ranging area that has been output from the AF ranging point setting section 33, and phase difference pixel data lines are generated for a plurality of areas around this area. It should be noted that AF ranging point is not limited to a ranging point that has been determined by the face detection section 22a and/or the tracking section 22b, and may also be set manually by the photographer, and may be set using an inference model that has been learned by deep learning. Further, the AF ranging point is not limited to a local ranging point, and may also be a wide area of the screen and may be all ranging points within the screen. This phase difference pixel data that has been generated is output to the first AF calculation section 35.

The first AF calculation section 35 has a defocus amount calculation section 35a and a reliability evaluation section 35b. The defocus amount calculation section 35a calculates phase difference using phase difference pixel data lines for left and right openings. The defocus amount calculation section 35a calculates defocus amount of the focus lens based on a known phase difference method. Specifically, the phase difference pixel generating section 34 outputs a phase difference pixel data line that has been output by left opening phase difference pixels, and a phase difference pixel data line that has been output by right opening phase difference pixels. The defocus amount calculation section 35a then calculates a degree of correlation while shifting the two phase difference pixel data lines, and calculates defocus amount of the focus lens based on a shift amount where this degree of correlation becomes maximum. Refer, for example, to FIG. 5 to FIG. 7 of Japanese patent laid open number 2018-097253 (US patent application publication number US 2018/0176453). US Patent Application Publication No. US 2018/0176453 is incorporated herein by reference.

The reliability evaluation section 35b evaluates reliability of the defocus amount data has been calculated by the defocus amount calculation section 35a. Evaluation of reliability of the defocus amount may use a known method. For example, reliability of the defocus amount may be evaluated based on gradient of degree of correlation in the vicinity of shift amount where the degree of correlation becomes maximum (refer, for example, to FIG. 7 in Japanese patent laid open number 2018-097253 (US patent application publication number US 2018/0176453).

The first AF calculation section 35 outputs defocus amounts for each ranging area, that have been calculated by the defocus amount calculation section 35a, and an evaluation value for reliability that has been calculated by the reliability evaluation section 35b, to the second AF calculation section 36.

The second AF calculation section 36 comprises a statistical processing section 36a, movement state estimating section 36b, and ranging area selection section 36c. The statistical processing section 36a performs statistical processing on a lens pulse value resulting from having converted defocus amount for each ranging area that was calculated in the defocus amount calculation section 35a to a focus lens position where focus is achieved. As statistical processing, in this embodiment quartiles are obtained (refer, for example, to S11 in FIG. 3 and to FIG. 9). A quartile is a partition value when dividing a number of data points into four parts, with data arranged from smallest to largest. Quartiles will be described later using FIG. 9. Also, before obtaining quartiles, in this embodiment a plurality of lens pulse values that have been calculated are divided into a plurality of lens pulse regions (refer to S5 in FIG. 3, and to FIG. 6, which will be described later), and among the lens pulse regions that have been divided, lens pulse regions for the close-up end and the infinity end are excluded (refer to S7 and S9 in FIG. 3, and to FIG. 7 FIG. 8, which will be described later). Quartiles are obtained using this lens pulse region division, and data of lens pulse values that have been subjected to close-up end and infinity end exclusion processing. Operation of the statistical processing performed by the statistical processing section 36a will be described later using FIG. 4.

The statistical processing section 36a functions as a statistical processing section that performs statistical processing on ranging values of a plurality of detection areas (refer, for example, to S5 to S11 in FIG. 3, and to FIG. 4 and FIG. 6 to FIG. 9). The above-described statistical processing section uses quartiles. The statistical processing section calculates standard deviation and/or average values. With this embodiment, the statistical processing section 36a calculates quartiles, but the invention is not limited to calculating quartiles, and standard deviation and average values may be calculated, and movement of the subject estimated using representative values (for example, average value±standard deviation) that include statistical values representing dispersion.

The movement state estimating section 36b estimates movement of the subject. When estimating this subject movement, the movement state estimating section 36b uses quartiles that have been calculated by the statistical processing section 36a. The statistical processing section 36a calculates quartiles every time pixel data for one frame is output, and so the movement state estimating section 36b estimates subject movement based on change in differences between quartiles (Q1, Q2, Q3) for the previous frame and the current frame (refer, for example, to S15 in FIG. 3). This estimation is performed when reliability of the quartiles is high (refer to S13 in FIG. 3). Estimation of subject movement will be described later using FIG. 11 to FIG. 13.

Figure 11:
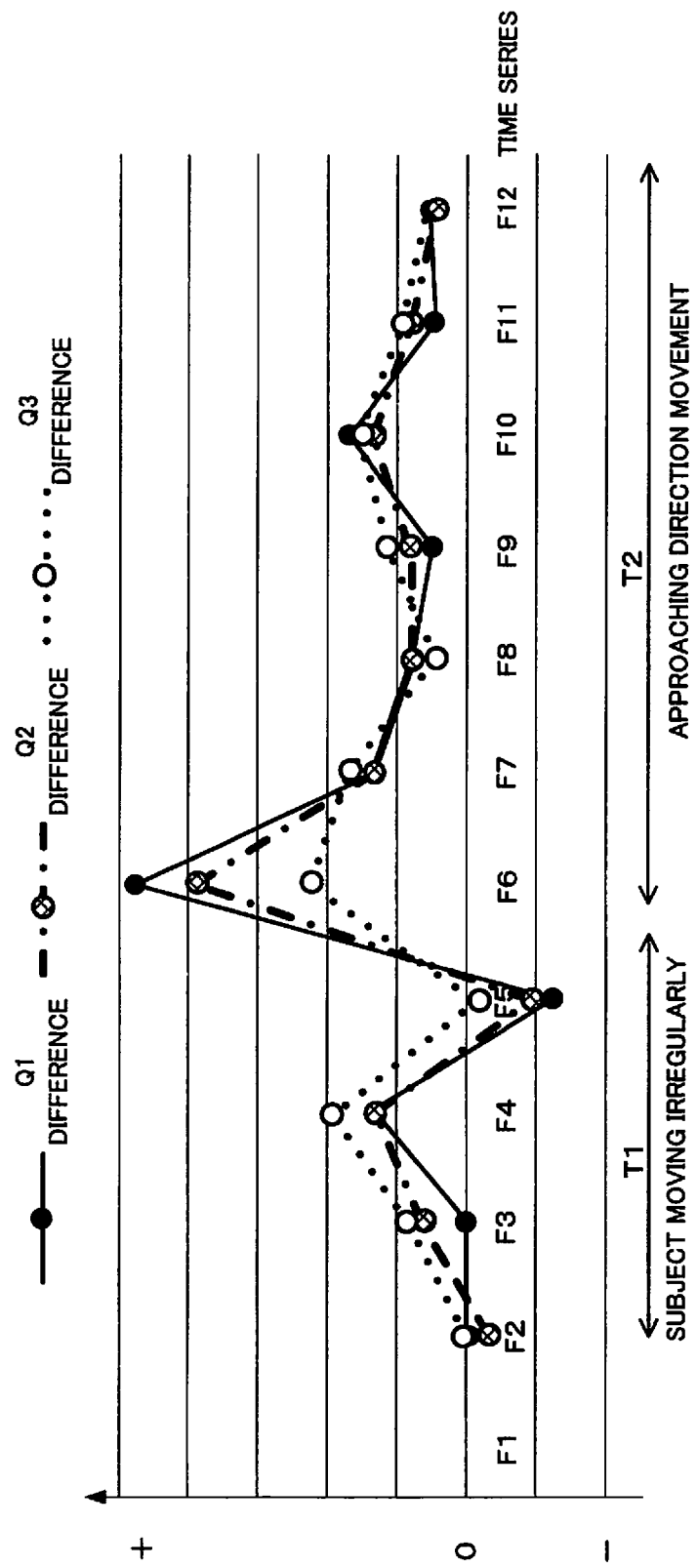
FIG. 11 is a graph showing chronological change of each difference value in a case where data relating to range has been divided into interquartile ranges, in the camera of one embodiment of the present invention.
Figure 12:
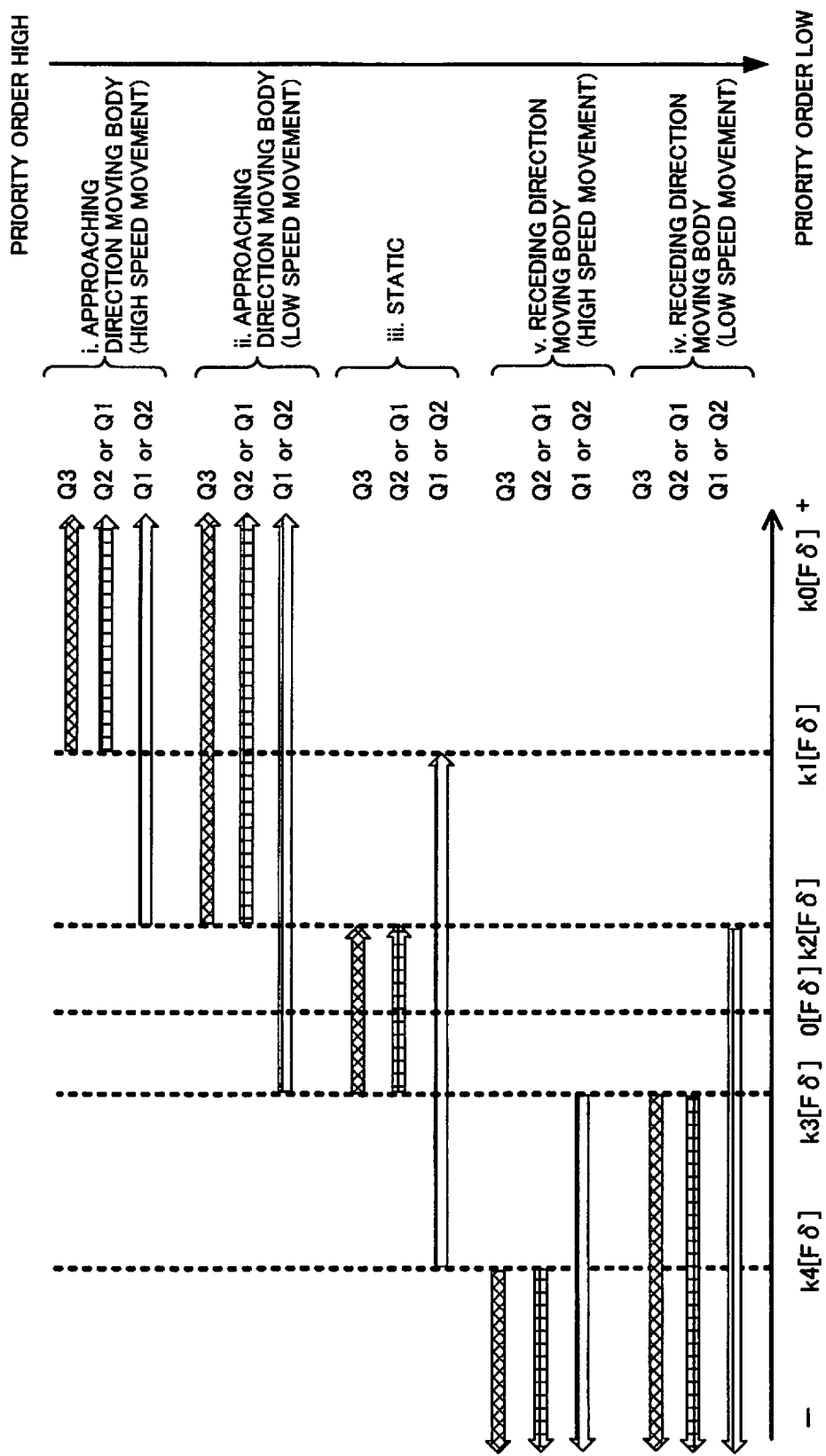
FIG. 12 is a drawing showing a comparison of each difference value and a threshold value, in a case where data relating to range has been divided into interquartile ranges, in the camera of one embodiment of the present invention.
Figure 13:
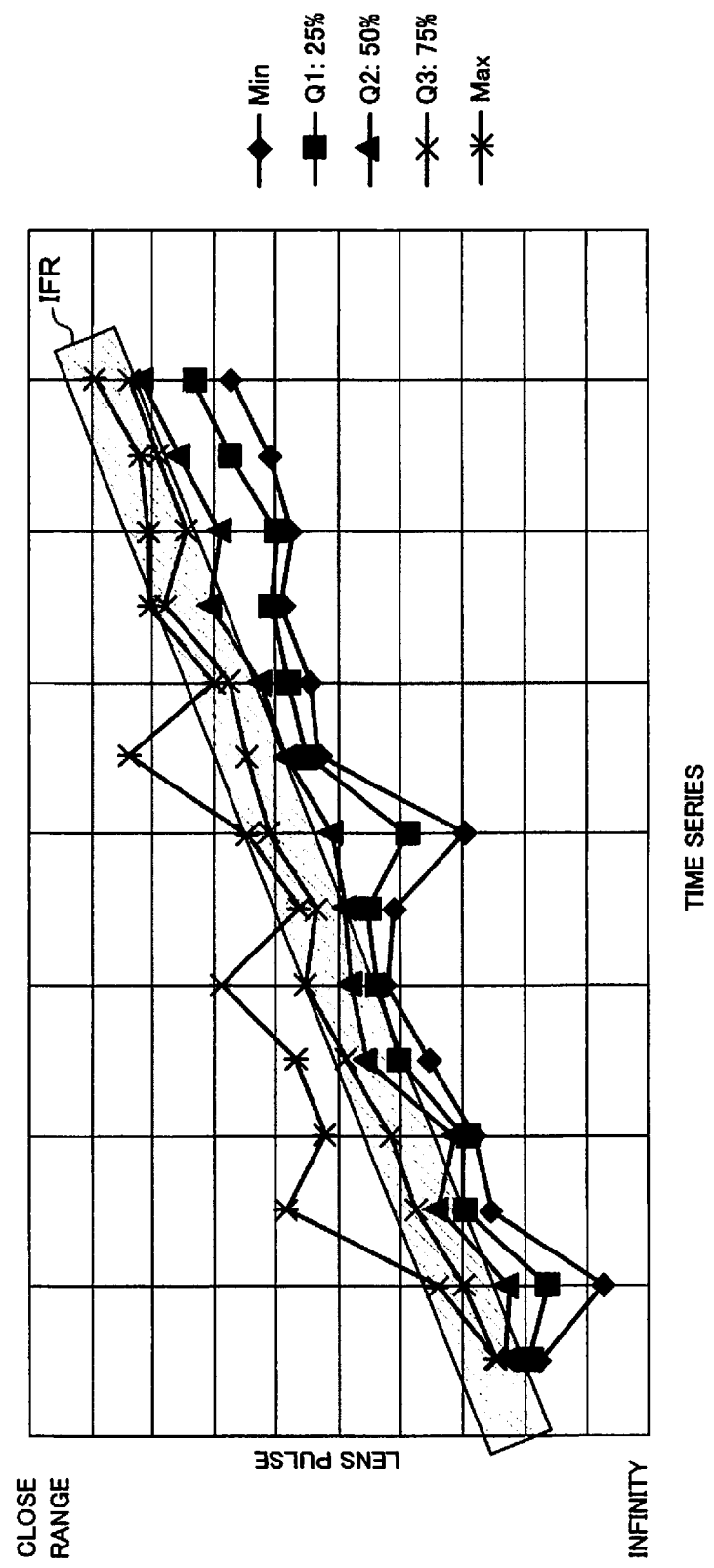
FIG. 13 is one example showing results of adopting quartiles, in the camera of one embodiment of the present invention.

The movement state estimating section 36b functions as a movement state estimating section that calculates representative values containing statistical dispersion based on statistical processing, and estimates movement state of an object based on time series change in representative values (refer, to S15 in FIG. 3, and to FIG. 11 to FIG. 13). In this embodiment, quartiles such as 1st to 3rd quartiles are used as representative values, but if there are values resulting from having subjected ranging values of a plurality of detection areas to statistical processing, it is possible to use representative values that include values other than quartiles, such as, for example, average values and standard deviation. That is, a representative value may be a value that includes average value and/or standard deviation. For example, statistical dispersion may be standard deviation and/or mean deviation, and representative values that include statistical dispersion may be average value±standard deviation and/or average value±mean deviation.

Figure 5A:
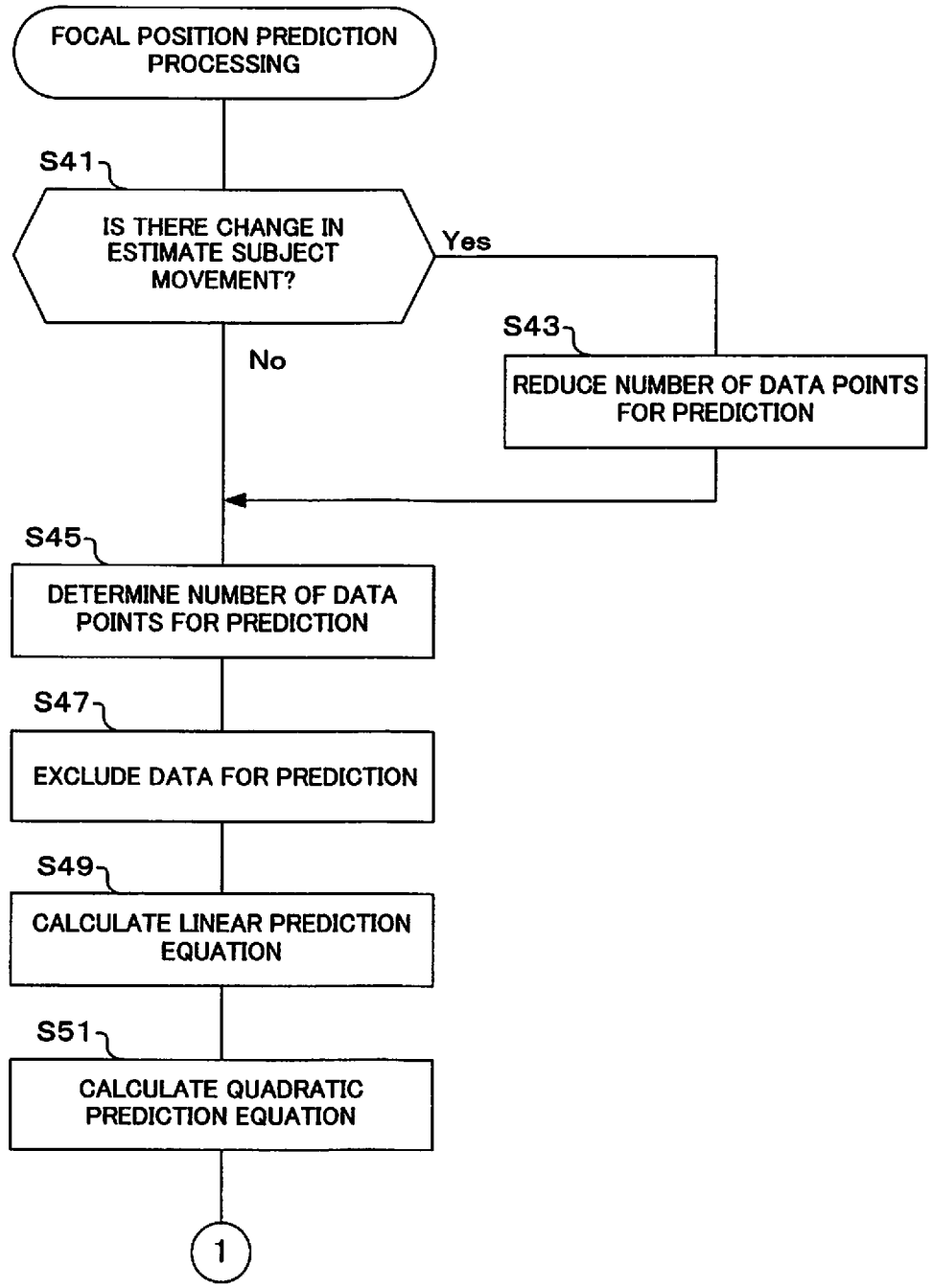

The above mentioned movement state estimating section estimates movement direction of an object based on time series change in representative values (refer, for example, to FIG. 5A, FIG. 5B, and FIG. 12). In this embodiment, quartiles such as 1st to 3rd quartiles (Q1, Q2, Q3) are used as representative values that contain statistical dispersion. Difference values for different times are used as time series change in representative values, and movement direction is estimated based on these difference values (refer, for example, to FIG. 12). The movement state estimating section estimates movement speed of an object based on time series change in representative value (refer, for example, to FIG. 12). In this embodiment, quartiles such as 1st to 3rd quartiles (Q1, Q2, Q3) are used as representative values that contain statistical dispersion. Difference values for different times are used as time series change in representative values, and movement speed of a subject is estimated by comparing these difference values with a specified threshold value (refer, for example, to FIG. 12).

The above mentioned movement state estimating section determines reliability based on time series change in representative values, and if it is determined that there is reliability, estimates and outputs movement state of an object (refer, for example, to S13 in FIG. 3, and to FIG. 10). The movement state estimating section makes a representative value the first quartile, or the second quartile, or the third quartile. The movement state estimating section determines reliability based on time series change in interquartile range, and if it is determined that there is reliability, estimates and outputs movement state of an object (refer, for example, to S13 and S15 in FIG. 3, and to FIG. 10 to FIG. 13). The movement state estimating section determines reliability based on degree of dispersion in interquartile range, size of interquartile range, or number of effective ranging values contained in the interquartile range (refer, for example, to S13 in FIG. 3).

The ranging area selection section 36c selects ranging areas to be used at the time of focus adjustment using the focus lens, based on lens pulse values resulting from having converted defocus amounts for each ranging area that were calculated by the defocus amount calculation section 35a (refer, for example, to S17 in FIG. 3). Selection of ranging areas is performed using a known method, such as areas that have closest range data among the plurality of ranging result, areas that have been selected manually by the photographer, areas in which a face is been detected, and areas that have been selected based on conventional moving body prediction etc. It should be noted that the ranging area selection section 36c is not limited to data of a single ranging area, and data resulting from having processed data of a plurality of related ranging areas may also be output.

The second AF calculation section 36 outputs lens pulse values resulting from having converted the focus amounts for ranging areas that were selected by the ranging area selection section 36c, and subject movement that has been estimated by the movement state estimating section 36b, to the focal position prediction section 37. The focal position prediction section 37 calculates (predicts) position of the focus lens where focus will be achieved, at the time of actual shooting, based on history of lens pulse values resulting from having converted defocus amounts for selection areas. Based on this predicted value, a lens command value (lens pulse value) is transmitted to the lens control section 13 within the interchangeable lens 10. The focal position prediction section 37 can perform moving body prediction to predict position of the focus lens where focus is achieved at the time of actual shooting using a known method. Specifically, known moving body prediction is a method of calculating position of the focus lens where focus is achieved at the time of actual shooting using history of position of the focus lens (lens pulse values) and a specified moving body estimation computation equation.

Also, the focal position prediction section 37 of this embodiment can predict position of the focus lens where focus will be achieved at the time of actual shooting, using movement state of the subject that has been estimated by the movement state estimating section 36b. This prediction will be described later using FIG. 5A and FIG. 5B. The focal position prediction section 37 functions as a prediction section that predicts focal position relating to an object based on movement state of a subject that has been estimated (refer to S19 in FIG. 3, and to FIG. 5A and FIG. 5B).

Next, AF operation of this embodiment will be described using the flowchart shown in FIG. 3. This flow is executed by the CPU etc. that is provided within the AF calculation section 23 controlling each section shown in FIG. 1 and FIG. 2 based on programs that have been stored in the nonvolatile memory.

If the photographer performs a shooting instruction operation, such as by pressing down the release button halfway (1st release), and the image sensor 21 acquires image data for one frame, the AF operation shown in FIG. 3 is commenced. If AF operation is commenced, first, ranging calculation is performed (S1). Here, center coordinate/range is set for each ranging area that has been set by the AF ranging point setting section 33, based on central coordinates/specified coordinates that have been output from the image processing section 22. The phase difference pixel generating section 34 generates left and right opening AF pixel data lines based on the settings, and the defocus amount calculation section 35a within the first AF calculation section 35 calculates defocus amount of each ranging area using the AF pixel data lines. Calculation of defocus amount is performed using a known phase difference AF method (refer, for example, to FIG. 5 to FIG. 7 of Japanese patent laid open number 2018-097253 (US patent application publication number US 2019/0176453). It should be noted that, as will be described later, if the processing of step S19 is completed, and if operation of the release button is maintained, processing returns to step S1 and ranging calculation is repeated.

If ranging calculation has been performed, next, reliability determination and exclusion processing are performed (S3). Here, the reliability evaluation section 35b evaluates reliability of the defocus amount that has been calculated in step S1. Reliability is evaluated, for example, based on inclination of degree of correlation in the vicinity of shift amount where the degree of correlation, that was obtained at the time of calculation of defocus amount, becomes maximum (refer, for example, to FIG. 7 in Japanese patent laid open number 2018-097253 (US patent application publication number US 2018/0176453)). Data from ranging areas for which it has been determined that evaluation value for reliability is lower than a predetermined value, and that are therefore not reliable, is excluded, and that data is not used in subsequent processing.

Figure 4:
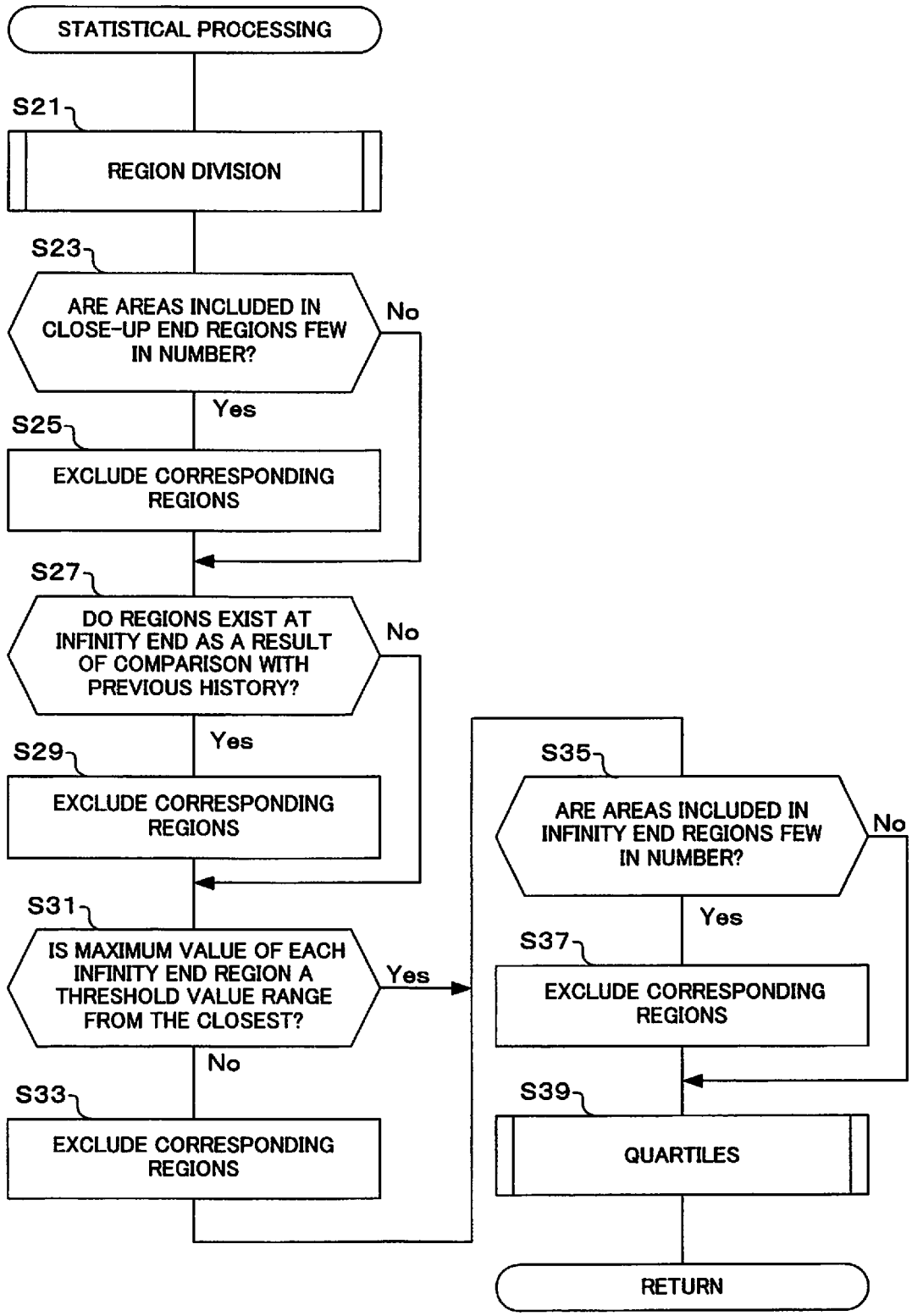
FIG. 4 is a flowchart showing operation of statistical processing of the camera of one embodiment of the present invention.

If reliability determination and exclusion processing have been performed in step S3, the statistical processing section 36a performs statistical processing in steps S5 to S11 (detailed operation of this statistical processing will be described later using FIG. 4). In this statistical processing, quartiles are calculated, and in this calculation of quartiles region division is first performed (S5). In this embodiment, in order to reduce a number of lens pulse values for which calculation of quartiles is performed, and thus reduce processing time, lens pulse values that are estimated to correspond to unwanted subjects other than the main subject (crossing subjects and background etc.) are excluded. To do this there is division into a plurality of lens pulse regions by determination from distribution of lens pulse values of groups of target ranging areas, and threshold values. Respective defocus amounts for ranging areas constituting targets, such as ranging areas that have been set manually by the photographer, or ranging areas corresponding to tracking that has been automatically set inside the camera, ranging area groups contained in recognized areas resulting from face detection and deep learning etc., and all ranging areas within the photographing screen, are then converted to lens pulse values. Lens pulse values are values resulting from having converted defocus amounts to positions of the focus lens corresponding to in focus, as was described previously.

Once there has been conversion to lens pulse value, all lens pulse values arranged in ascending order. If the lens pulse values have been arranged, next, differences between adjacent lens pulse values are calculated. A specified number of higher ranking larger difference values are then compared with a threshold value, and once a difference value becomes larger than the threshold value, the lens pulse value corresponding to that difference value is set as a boundary line of a lens pulse region.

Region division will be specifically described using FIG. 6. The vertical axis in FIG. 6 is lens pulse value, with the lower part of the vertical axis being infinity and the upper part of the axis being the close-up end. White circles within the frame Vm are values resulting from having converted defocus amounts for each ranging area, that have been generated by ranging (focus detection) once (a frame), to lens pulses, and these lens pulse values (values of target lens pulse positions) are plotted. Once the lens pulse values have been plotted, next, difference values between two adjacent lens pulse values are calculated (this value is called difference pulse value).

If difference pulse values have been obtained, the difference pulse values are compared with a specified threshold value, in order of size of the difference pulse values, and it is determined whether the difference pulse value is greater than the threshold value. This determination is performed for only a specified number of difference pulse values, starting from the largest, in order to shorten processing time. With the example shown in FIG. 6, determination is performed for the difference pulse values that are ranked 1st to 5th from the largest, and determination is not performed for those values ranked 6th and 7th. In FIG. 6, the difference pulse value that are ranked 1st to 4th are greater than the threshold value and so are made a boundary (line), while the 5th ranked difference pulse value is less than the threshold value and is not made a boundary (line).

Based on the result of this determination a boundary line is drawn between two lens pulse values that have difference pulse values that are apart by more than the threshold value, thus dividing lens pulse values of each ranging area into a plurality of lens pulse regions. With the example shown in FIG. 6 there is division into five regions, namely region 0 to region 4. Since lens pulse values within each lens pulse region have a difference pulse value that is within a specified threshold value, distances to an object corresponding to lens pulse values within the same region are within a specified range, and it is determined that it is the same object.

If the division into lens pulse regions has been performed in step S5, close-up end region exclusion is performed next (S7). After lens pulse region division, and after having excluded regions other than lens pulse regions relating to the main subject, quartiles are applied. This is because if information for other than the main subject is also included, reliability of results to which quartiles have been applied will become lower. With regard to the close-up end, lens pulse regions located closer to the lens pulse values (target lens pulse positions) that have been set using history information of quartiles are specified. Then, in a case where a number of areas (number of lens pulse values) that are included in this lens pulse region is a small number that is less than a specified number, it is determined to be a lens pulse region corresponding to an unwanted subject such as a crossing subject, or a lens pulse region that includes a ranging error, and the lens pulse region is excluded.

FIG. 7 is one example of exclusion of a small number of close-up end lens pulse regions, and exclusion of a small number of close-up end lens pulse regions will be described using FIG. 7. In FIG. 7 also, the vertical axis is lens pulse value, with the lower part of the vertical axis being infinity and the upper part of the axis being the close-up end, and the horizontal axis represents time. Similarly to FIG. 6, white circles within the frame Vm1 plot lens pulse value of each ranging area that has been calculated in the current frame. With the example shown in FIG. 7 lens pulse values of each ranging area are divided into four, namely lens pulse regions 0 to 3.

Figure 9:
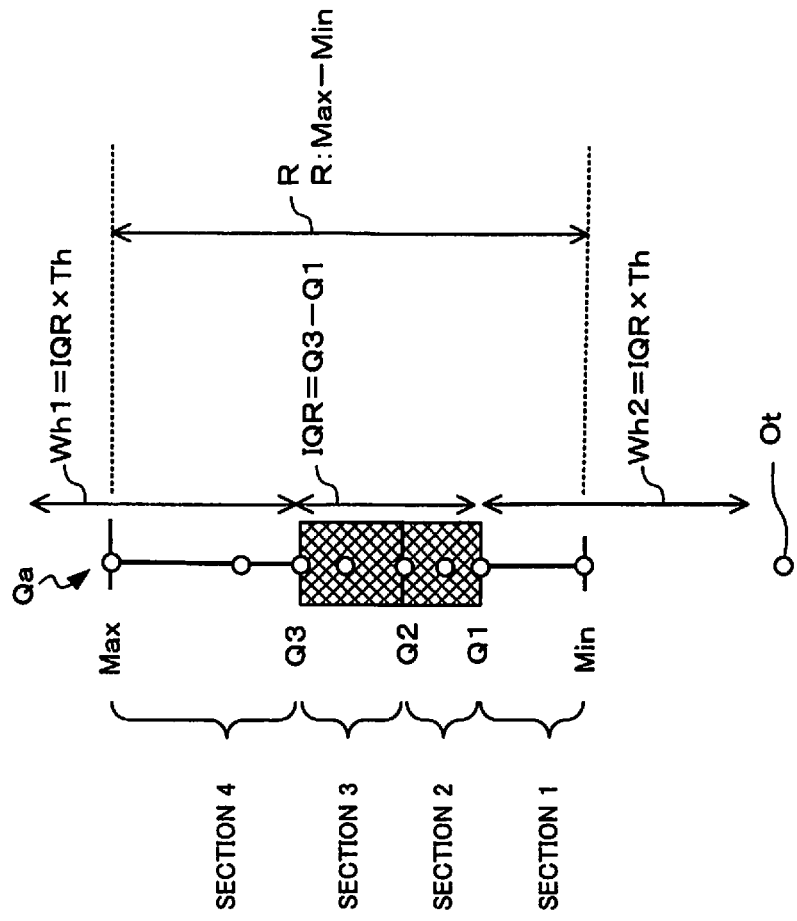
FIG. 9 is a drawing for describing division of data relating to ranging of target ranging areas, using quartiles, in the camera of one embodiment of the present invention.

In FIG. 7, Qa0 is a box plot (or box-and-whisker plot) showing quartiles that have been calculated in the previous frame (quartiles will be described later using FIG. 9). A maximum value Max of this quartile is compared with each lens pulse value that was calculated in this frame (refer to within frame Vm1), and with the example shown in FIG. 7 the lens pulse values belonging to lens pulse regions 1 and 0 are both greater than the maximum value Max. Of these, the number of lens pulse values belonging to lens pulse region 1 is greater than a fixed number (for example, three), but the number of lens pulse values belonging to lens pulse region 0 is not greater than the fixed number. With the number of lens pulse values contained in the lens pulse region 0 being less than the fixed number, it is determined that a subject corresponding to the lens pulse values of this lens pulse region 0 is an unwanted subject such as a crossing subject, or that there is a high possibility of the lens pulse values including a large ranging error. As a result of this, the lens pulse values belonging to lens pulse region 0 are excluded when calculating quartiles for the current frame.

If close-up end lens pulse region exclusion has been performed in step S7, then next, infinity end lens pulse region exclusion is performed (S9). Here, exclusion is performed by comparing maximum lens pulse value in the current frame with history information of quartiles (specified number of previous frames). Also, results of estimating subject movement estimated up to the previous frame (refer to step S15 which will be described later) are also referenced, and if there are lens pulse regions detected conclusively away from the infinity end they are excluded. It should be noted that at a time corresponding to a specified number of frames the image sensor 21 performs readout of pixel data for one screen, and the "current frame" is pixel data for one screen that has been read out immediately after.

Also, as infinity end lens pulse region exclusion, regions having lens pulse values that are smaller than a value resulting from having subtracted a fixed value from the maximum value of lens pulse value for the current frame are excluded. Further, similarly to the close-up end, if only a few lens pulse values are contained in a lens pulse region, that lens pulse region is excluded. By performing these processes, background subjects etc. of the main subject are separated and excluded.

Figure 8:
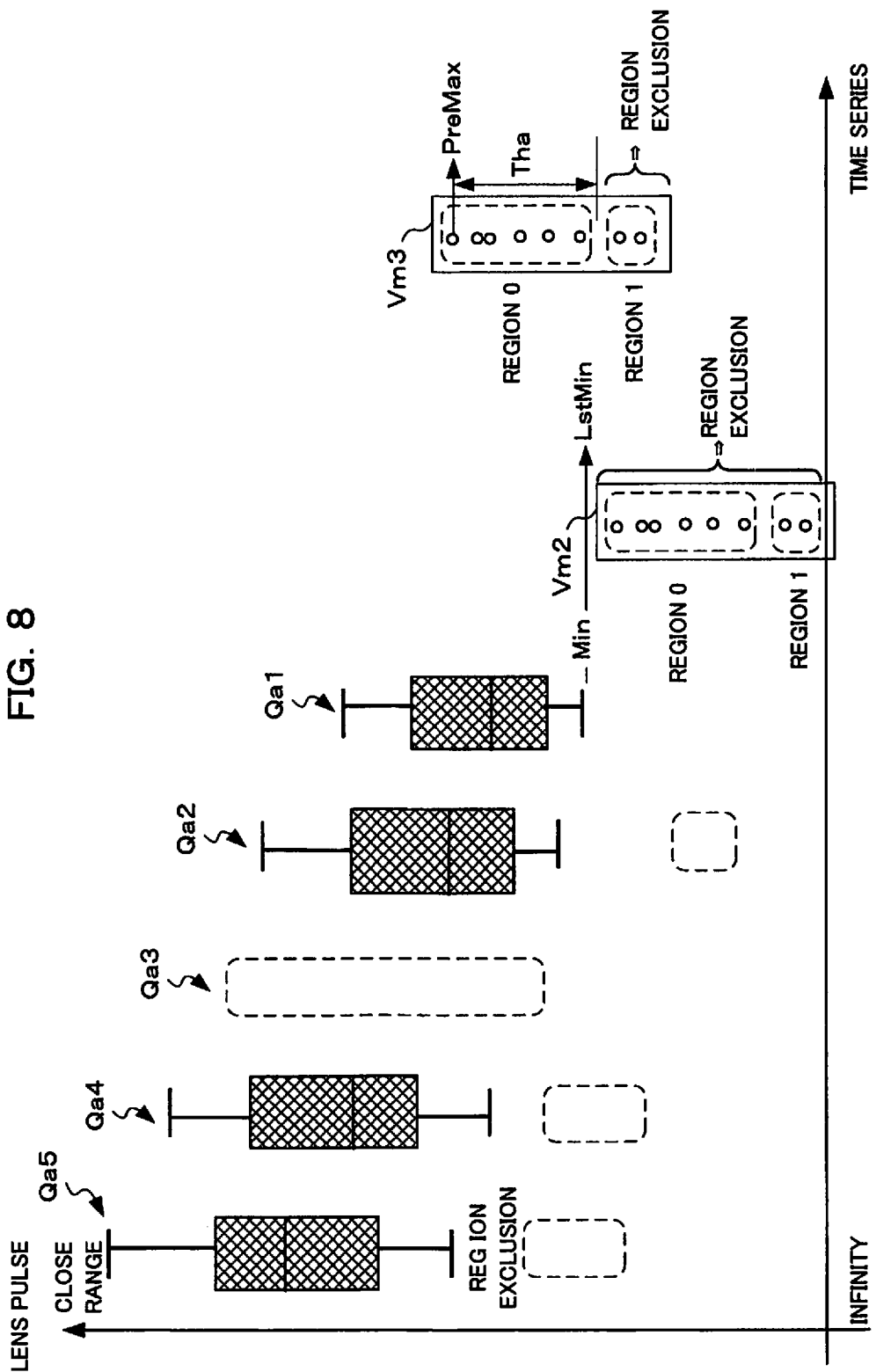
FIG. 8 is a drawing for describing the fact that regions at the infinity end are excluded, using history information, in the camera of one embodiment of one embodiment of the present invention.

FIG. 8 is one example of exclusion of infinity end lens pulse regions, and exclusion of infinity end lens pulse regions will be described using FIG. 8. In FIG. 8 also, the vertical axis is lens pulse value, with the lower part of the vertical axis being infinity and the upper part of the axis being the close-up end. Also, the horizontal axis in FIG. 8 represents lapse of time. White circles within frame Vm2 are examples of lens pulse values for each ranging area, in the current frame, similarly to FIG. 6, and there is division into lens pulse regions 0 and 1.

In FIG. 8, box plots Qa1 to Qa5 show history of quartiles corresponding to previous frames, with box plot Qa1 being quartiles corresponding to the previous frame, and box plot Qa2 being quartiles for the frame before that. Quartiles in a frame three frames before are invalid (shown by Qa3, specifically, Qa3 is a quartile invalid frame), and quartiles for 4 frames before and 5 frames before are the box plots Qa4 and Qa5, respectively. With the example shown in FIG. 8, a maximum value of lens pulse value within the current frame Vm2 is smaller than a minimum value LstMin of quartiles for the previous frame Qa1 (at the infinity end side), and so lens pulse regions 0 and 1 are excluded (refer to S27 and S29 in FIG. 4). In this way, if valid lens pulse values do not exist in the current frame it is determined to be a state where a main subject has been out of the target ranging areas. In this type of state, lock on processing that does not move the focus lens is performed, and an operation is performed to await generation of valid lens pulse values for the next frame. As a result, movement of the focus lens to the wrong position is prevented.

In FIG. 8, white circles within frame Vm3 are another example of lens pulse values for each ranging area, in the current frame, similarly to FIG. 6, and there is division into lens pulse regions 0 and 1. With these other examples, lens pulse region 1 is positioned more toward the infinity end than a value resulting from having subtracted a particular fixed value Tha from the maximum value PreMax for the current frame, and this lens pulse region 1 is excluded (refer to S31 and S33 in FIG. 4). In this way, lens pulse values having a difference from the maximum lens pulse value of the current frame that is larger than Tha are determined to be unnecessary background, and are excluded.

In this way, in steps S5 to S9, there is division into respective lens pulse regions based on lens pulse values that have been acquired for each ranging area, and for each lens pulse region, a lens pulse region for the close-up end that has been determined to contain only a small number of lens pulse values is excluded. Lens pulse regions at the infinity end are also excluded by comparing history information quartiles and threshold values that have been set in advance. As a result of these processes it is possible to exclude lens pulse values corresponding to other than the main subject with good precision, and it is possible to retain only lens pulse values corresponding to the main subject. Next, quartiles for the current frame are calculated using the lens pulse values corresponding to this main subject (S11).

In this step S11, quartiles are applied by arranging a plurality of lens pulse values that have been calculated in ascending order. A quartile is a statistical method in which a center value Q2 (second quartile) in an ascending array of all data is obtained, data is divided into two regions with this value as a boundary, center values Q1 (first quartile) and Q3 (third quartile) within each of the respective regions that have been divided into two are obtained, and there is further division into regions with those two center values as boundaries, to give three boundaries and four sections. Quartiles can be illustrated as box plots, and an image of a box plot Qa is shown in FIG. 9. In the box plot Qa, the nine white circles represent lens pulse values that have been acquired in each ranging area (as one example, 9 points) similarly to FIG. 6 etc.

Size of a box is determined using values Q1 to Q3. The size of the box, specifically the interquartile range IQR, is Q3−Q1 (a range from value Q3 to value Q1). Also, lengths of whiskers Wh1 and Wh2 are determined based on the box size (IQR) and a predetermined threshold value Th, using Wh1=IQR×Th, Wh2=IQR×Th. Also, a minimum value of lens pulse values that exists within the length of the whiskers Wh1 and Wh2 is set as Min (minimum value used in quartiles), while a maximum value of lens pulse values that exists within the length of the whiskers Wh1 and Wh2 is set as Max (maximum value used in quartiles), and between the maximum value and minimum value (Max-Min) in quartiles is made range R. Lens pulse values that exist outside the lengths of the whiskers Wh1 and Wh2 are excluded as outlier values Ot.

Values of Min (minimum value within the range, infinity side), Q1 (25% position), Q2 (50% position), Q3 (75% position), and Max (maximum value within the range, close-up end), and information such as current lens pulse value, are saved as time series data, and movement state (movement) of the subject (object) is estimate using history information of those values. In order to divide into the three boundaries and four sections, the number of lens pulse values (number of corresponding ranging areas) is desirably greater than a fixed number (a minimum being more than 5).

Once the quartiles have been calculated in step S11, reliability of the quartiles is next determined (S13). Here, the movement state estimating section 36b determines reliability of the quartiles that were calculated in step S11. First, in order to measure degree of dispersion in the quartiles that have been calculated, history information of an interquartile range corresponding to a plurality of frames that were acquired in a given fixed period is made into a frequency distribution table (histogram) such as shown in FIG. 10, for example. It should be noted that the statistical processing section 36a may also determine reliability of the quartiles.

In FIG. 10, values for a plurality of interquartile ranges (IQR=Q3−Q1: refer to FIG. 9) corresponding to a plurality of frames that were acquired in a fixed period, are compared with ranges of classes that have been set beforehand, and corresponding classes are counted to obtain a number of times (frequency). Next, a relative frequency (=number of times in that class/total number of times (total in FIG. 10) is calculated for every class. In FIG. 10 a class is set with reference to F6, in units resulting from having converted allowable defocus amount F6 to lens pulse value, with F being aperture value and δ being permissible circle of confusion. For example, if a total amount of relative frequency for the first and second ranking classes that has the most frequent value is greater than a threshold value, dispersion in interquartile range that was acquired in a fixed period is small, that is, dispersion in the quartile is small, and it is determined that reliability is high. With the example shown in FIG. 10, a total of relative frequency for two classes, namely class a~b (first most frequent value) of interquartile range and class b~c (second most frequent value) becomes 0.8 (0.4+0.4). The total of this relative frequency is compared with a threshold value (for example, 0.7), and since the total for relative frequency is larger than the threshold value it can be determined that reliability of the quartiles is high.

Further, by comparing a value for interquartile range IQR with a threshold value for every frame, if the interquartile range is less than the threshold value and the range is sufficiently narrow it is assumed that lens pulse values (ranging areas) that have applied quartiles only correspond to the main subject, and the quartiles for that frame can be determined to have high reliability. If the interquartile range IQR is larger than the threshold value then dispersion in lens pulse values is large, it is assumed to be a case where a background is also included as well as the main subject, or a case where the main subject itself has depth, and it can be determined to be a state where reliability is low.

Also, values of the range R (max-min) based on the quartiles (FIG. 9) tend to have large dispersion compared to the interquartile range IQR. They can therefore be used in reliability determination by looking at a correlation relationship with a range R and values of the interquartile range IQR. For example, for a class of the first or second most frequent values of interquartile range IQR (FIG. 10: a~b or b~c), if they become a class where the most frequent range value of R (b~c) is larger, or a class that is the same, it is determined that reliability of the quartile is high.

Besides the above described method, reliability of both quartiles and results of applying those quartiles may be determined collaboratively using numbers of valid lens pulse values (ranging areas) contained in the interquartile range of each frame, and/or information such as proportion of number of frames for which quartiles can be applied, among a plurality of continuous frames. If reliability of a quartile is low, quartiles for that frame are not used in estimation of subject movement (refer, for example, to Qa3 in FIG. 8).

Once reliability of the quartiles has been determined in step S13, subject movement is next estimated (S15). When predicting focal position in step S19, subject movement is taken into consideration. In this step S15, therefore, the movement state estimating section 36b estimates subject movement using the quartiles that were calculated in step S11.

In step S15, in order to estimate subject movement in a short period, the movement state estimating section 36b uses quartiles Q1~Q3 of two continuous frames. On the other hand, since minimum value Min and maximum value Max used in the quartiles tend to have large dispersion compared to Q1~Q3, they are not used. Differences between respective Q1~Q3 between the current frame and the previous frame are calculated. If a difference value is close to 0, movement of the subject across frames is small, and it can be estimated that the subject is stationary. Also, if a difference value becomes positive it can be estimated that the subject is moving in an approaching direction. If a difference value becomes negative it can be estimated that the subject is moving in a receding direction. Further, if a difference value is large it can be estimated that movement speed of the subject is fast while if the difference values small it can be estimated that the speed of the subject is slow.

In order to estimate subject movement over a long period, the movement state estimating section 36b applies a plurality of subject movement estimation results that have been estimated over the above described short period (across two continuous frames) to a plurality of frames greater in number than the two frames within a fixed period. Specifically, by analyzing continuity of subject movement across a plurality of consecutive two frames that has been estimated, it is determined whether the subject is stationary, whether the subject is moving in a receding or approaching direction, and whether the subject is moving irregularly etc.

One example of chronological change in difference values for Q1~Q3 is shown in FIG. 11. The horizontal axis of the graph shown in FIG. 11 corresponds to frame number (elapsed time), with F1 being a time when a first frame is imaged, for example, and F2 being a time when a second frame is imaged (the same also applies to F3~F12). Also, the vertical axis of the graph represents difference value level for Q1, Q2 and Q3, with a Q1 difference at time F2 being a difference value of Q1 for times F2 and F1, a Q2 difference at time F2 being a difference value of Q2 for times F2 and F1, and Q3 difference at time F2 being a difference value of Q3 for times F2 and F1. Each point in the graph of FIG. 11 represents respective difference values for Q1, Q2, and Q3 between two frames, being the current frame and the previous frame. By determining what change there is in difference values of Q1~Q3 across specified continuous frames, it is possible to estimate long-term subject movement.

With the example shown in FIG. 11, in the earlier period T1 (substantially from times F2 to F5), difference values for Q1~Q3 change positively and negatively across 0, and it can be determined that the subject is moving irregularly. Also, in the later period T2 (substantially from times F6 to F12), difference values for Q1~Q3 are continuously positive, and it can be generally determined that the subject is moving in an approaching direction.

FIG. 12 shows a method of estimating subject movement, by comparing difference values for Q1~Q3 with threshold values (arrowed ranges) to determine which of states i~v the difference values correspond to. In FIG. 12, state determination is executed in order of highest priority, from i to iv. The Q3 arrow represents a lens pulse value range for determining what range Q3 difference values correspond to, and the Q2 or Q1 arrow represents a range for determining what range Q2 difference values or Q1 difference values corresponds to. Regarding the Q1 or Q2 arrow, if a difference value for Q2, in the determination for Q2 or Q1, corresponds to the range of Q2 or Q1 arrow, it means a range for determining if a difference value for Q1 corresponds to the range of Q1 or Q2 arrow, and that determination is performed for that range. On the other hand, if a difference value for Q1, in the determination of Q2 or Q1, corresponds to the range of Q2 or Q1 arrow, it means a range for determining if difference value for Q2 corresponds to the range of Q1 or Q2 arrow state, and that determination is performed for that range. Also, the horizontal axis represents values resulting from having converted lens pulse value to a numerical value having units that are a product of aperture value F and permissible circle of confusion δ (corresponding to permissible depth). Although difference values are shown as lens pulse values in FIG. 11, in FIG. 12 the lens pulse values are shown by converting to numerical values having units of F×δ.

In FIG. 11, for example, at time F2 in the second frame, since difference values for Q1~Q3 are all close to 0 (within the range k3~k2 in FIG. 12), it is determined to correspond to "iii. static" in FIG. 12. Also, at time F4 of the fourth frame in FIG. 11, the difference values of Q1 to Q3 are in a + direction, and so it is determined to correspond to "ii. approaching direction moving body (low speed movement)" in FIG. 12. In this way, it is possible to estimate the subject movement (movement direction, movement speed) based on time series change of respective difference values for Q1, Q2, and Q3 across a plurality of frames. The method of FIG. 12 is one example and has movement state classified into 5 stages, but there may be more detailed setting of threshold values and classification into more stages.

FIG. 13 shows an example of making results of having applied quartiles into a graph in time series order. The vertical axis of the graph is lens pulse, and the horizontal axis is time corresponding to frame number. FIG. 13 shows chronological change in the quartiles Q1~Q3, and in Min and Max, with in focus range IFR that has been made a diagonal line representing actual in focus range of the subject. With the example shown in FIG. 13 it is a case where subject movement advances at a constant rate from the infinity end to the close-up end direction. With this example, values of Q3 and Q2 are located in the actual in focus range of the subject, and inclination of a graph of Q3 representing difference value of Q3 substantially matches the inclination of the focusing range IFR.

If subject movement has been estimated in step S15, next, ranging areas are selected (S17). Here, the ranging area selection section 36c selects ranging areas. With a method that is generally performed as a method for selecting ranging areas, for example, an area exhibiting a closest range lens pulse value may be selected from among lens pulse values of ranging areas that have not been excluded and have reliability, and also, ranging areas that have been designated instructed by the photographer may be tracked, and ranging areas may be selected based on results of face detection etc. Also, in the case of performing moving body prediction, areas exhibiting a lens pulse value that is closest to a moving body prediction value may be selected. Here, defocus amounts of ranging areas that have been selected are output to the focal position prediction section 37. It should be noted that defocus amounts that are output to the focal position prediction section 37 may be data of a single ranging area that has been selected, and if a plurality of ranging areas have been selected data of these ranging areas may be made into a single set of data.

Once ranging areas have been selected, next, focal position prediction processing is performed (S19). Here, the focal position prediction section 37 predicts focal position of a subject that is a tracking target at the time of actual shooting, based on defocus amount of a selection area that has been output from the second AF calculation section 36, and estimated subject movement. Since history information for defocus amount, that there is always a certain number of, is used in moving body estimation computation, in a case where subject movement has changed suddenly (for example, change from receding to approaching), it is difficult to deal with immediately. Accuracy of moving body estimation computation is therefore improved by using reliability determination results for the quartiles (refer to S13), and determination results for estimated subject movement (refer to S15). As a method of improving moving body estimation computation accuracy, all or either (one or a plurality) of the following (1) to (4) are implemented. It should be noted that detailed operation of focal position prediction processing will be described later using FIG. 5A and FIG. 5B.

(1) Subject movement that has been estimated using quartiles, and inclination of a prediction equation (representing subject movement) that has been calculated using moving body estimation computation, are compared, and if the advancing directions of the subject are different, for a computation method for the prediction equation, a linear equation is not selected, and an average value for a previous specified number of times, or a current value (most recently acquired value), is selected (refer to S55 and S57 in FIG. 5B). In the case of this state, there is a possibility that history information for defocus amount is incorrect, and so a linear equation with which there is a possibility of incorrectly predicting predicted position is not used, and average value and current value (most recently acquired value) are used. In this way it is possible to prevent erroneous moving body prediction AF.

(2) In a case where reliability of quartile application results is high, if it has been determined that there has been change in subject movement (from moving to static, from static to moving, or from approaching to receding, or from receding to approaching), a number of items of history information to be used when performing calculation with moving body estimation computation is reduced (refer to S41 and S43 in FIG. 5A). Moving body estimation computation predicts in-focus position of a subject after a predetermined time (at the time of actual shooting), using previous defocus amount. This means that a greater number of data for previous defocus amount will generally improve accuracy. However, in a case where there is a high possibility that subject movement is changing, the number of items of data for defocus amount that are used in moving body estimation computation is reduced, and by not using history information on the past side, it is possible to calculate predicted position with good accuracy using only the recent information closer to the latest.

(3) When reliability of quartiles is high, if it is determined that a subject that has been estimated using quartiles is moving at high speed, a prediction equation for moving body estimation computation is not a linear equation, and is changed to a quadratic equation (refer to S59 and S61 in FIG. 5B). In this state, since subject movement is high speed, by using a quadratic equation as the prediction equation, and not a linear equation, it is possible to calculate an appropriate predicted position of the subject significantly advancing to movement direction.

(4) When reliability of application results of quartiles is high, if it is determined that a subject that has been estimated using quartiles is moving at low speed, a prediction equation for moving body estimation computation is not a quadratic equation, and is changed to a linear equation (refer to S59 and S63 in FIG. 5B). In this state, since subject movement is low speed, by using a linear equation as the prediction equation, and not a quadratic equation, it is possible to calculate a highly accurate predicted position.

If moving body prediction has been performed in step S19, the flow for AF operation is terminated. If a state where the photographer has pressed the release button down halfway is maintained, and the image sensor 21 acquires image data for one frame, the processing of steps S1 to S19 are repeated again. Also, if the photographer presses the release button down fully, the lens control section 13 moves the focus lens to the focal position that was predicted in step S19, and actual shooting is performed.

In this way, in the flow for AF operation, quartiles are obtained (S11), subject movement is estimated using these quartiles (S15), and moving body prediction is performed using this estimated subject movement (S19). Quartiles can make processing scale small even with a huge number of ranging areas (lens pulse values), and so it is possible to calculate in a short time. Since it is possible to estimate subject movement with high-speed processing and with good accuracy using these quartiles, it becomes possible to perform moving body prediction AF with good accuracy.

Also, with the flow for AF operation, since lens pulse region division is performed before obtaining quartiles, and lens pulse values that are considered to be for unwanted subjects and ranging errors are excluded (refer to S5 to S9), it is possible to calculate quartiles with good precision. Further, since reliability of the quartiles that have been calculated is evaluated (refer to S13), and quartiles with low reliability are not used, it is possible to estimate subject movement with good accuracy.

It should be noted that in the flow for the AF operation, before calculating quartiles lens pulse region division is performed (refer to S5), and preprocessing is performed, such as excluding unnecessary lens pulse regions at the close-up end and at the infinity end (refer to S5 to S9). This is done in order to calculate quartiles with good accuracy, but if it is possible to ensure a certain degree of accuracy without executing this preprocessing it may be suitably omitted, or the contents of this preprocessing may be simplified. Also, before estimating subject movement in step S15, reliability of the quartiles has been determined, but if, in step S11, it is possible to calculate quartiles with a certain degree of reliability ensured, determination of the reliability of the quartiles (S13) may be omitted.

Also, in the flow for AF operation quartiles have been used as representative values that include statistical dispersion of ranging values, but this is not limiting, and values such as average value and standard deviation value etc. of ranging values (lens pulse values) of specified frames may also be used. In a case where statistical dispersion is made standard deviation or mean deviation, representative values that includes statistical dispersion may become average value±standard deviation, or average value±mean deviation. For example instead of the above described quartiles Q1, Q2 and Q3, (average value-standard deviation), average value, and (average value+standard deviation) may be used, and exactly the same processing may be performed. Instead of estimating reliability of the quartiles, a histogram may be created from history information of standard deviation, and if relative frequency of specified classes is greater than a threshold value it may be determined that reliability is high. Also, in a case where standard deviation of a particular frame is smaller than a specified threshold value, it may be determined that reliability of that frame is high. As a method of estimating subject movement, instead of difference values of quartiles across frames, difference values across frames for average value±standard deviation may be used. Also, different values across frames may also be applied to a method that estimates continuous subject movement using different values across a plurality of frames.

Next, operation of the statistical processing in steps S5 to S11 will be described using the flowchart shown in FIG. 4. If the flow for statistical processing is commenced, first, region division (lens pulse region division) is performed (S21). Here, the statistical processing section 36a performs region division using lens pulse values of each ranging area of a frame that has been acquired this time. Operation of this region division is the same as for step S5 in the flow of FIG. 3, and so detailed description is omitted.

Once division into lens pulse region has been performed in step S21, it is next determined whether areas that are included in lens pulse regions at the close-up end are few in number (S23). These steps S23 and S25 correspond to processing for close-up end lens pulse region exclusion in step S7 (refer to FIG. 3) that was described previously. In this step S23, the statistical processing section 36a compares lens pulse values contained in close-up end lens pulse regions, among the lens pulse regions that were divided in step S21, with threshold values. If the result of determination in step S23 is that the lens pulse values that are included in close-up end lens pulse regions are few in number (less than a threshold value), corresponding lens pulse regions are excluded (S25). Here, since there are only a few lens pulse values contained in the close-up end lens pulse regions, these lens pulse values are excluded from targets of calculation for quartiles (refer to FIG. 7). It should be noted that the lens pulse values that have been excluded are not used in moving body prediction.

If corresponding lens pulse regions have been excluded in step S25, or if the result of determination in step S23 was that lens pulse values contained in close-up end lens pulse regions were not few in number, then next, previous history is compared, and it is determined whether or not lens pulse regions exist at the infinity end (S27). These steps S27 and S37 correspond to processing for infinity end lens pulse region exclusion in step S9 (refer to FIG. 3) that was described previously. In this step. S27, the statistical processing section 36a compares lens pulse values contained in close-up end lens pulse regions, among the lens pulse regions that were divided in step S21, with previous history. Here, as was described using FIG. 8, it is determined whether or not there are lens pulse regions more to the infinity end side than the minimum value LstMin of the previous frame (previous lens pulse value furthest to the infinity end side). If the result of determination in step S27 is Yes, the corresponding lens pulse region is excluded (S29).

If the corresponding lens pulse regions have been excluded in step S29, or if the result of determination in step S27 was that infinity end lens pulse region do not exist as a result of comparison with previous history, then next, it is determined whether or not a maximum value for each infinity end lens pulse region is within a range of a threshold value from the closest distance (S31). Here, the statistical processing section 36a determines whether or not maximum values for each infinity end lens pulse region are located within a range of a certain fixed value Tha (threshold value) from a maximum value PreMax (closest range) for the current frame (refer to Vm3, PreMax, and Tha in FIG. 8). If the result of this determination is No, the corresponding lens pulse region is excluded (S33).

If the corresponding lens pulse regions have been excluded in step S33, or if the result of determination in step S31 is that maximum value for each lens pulse region at the infinity side is within a threshold value range from the closest distance, it is next determined whether or not lens pulse values contained in the infinity end side lens pulse region are few in number (S35). It was determined in step S23 whether or not lens pulse values contained in close-up end lens pulse regions were few in number. In this step for the infinity end side lens pulse regions, similarly to step S23, it is determined whether or not lens pulse values contained in these lens pulse regions are fewer than a specified number. If the result of this determination is Yes, the corresponding lens pulse region is excluded (S37).

If corresponding lens pulse regions have been excluded in step S37, or if the result of determination in step S35 was that areas contained in the infinity end side lens pulse regions were not few in number, next, quartiles are calculated (S39). Here, the statistical processing section 36a performs calculation of quartiles using lens pulse values of each ranging area of a frame that has been acquired this time. Calculation operation for the quartiles is the same as for step S11 in the flow of FIG. 3, and so detailed description is omitted. Once quartiles have been calculated, the originating flow is returned to.

In the flow for this type of statistical processing, quartiles are calculated using lens pulse values that have been respectively calculated in a plurality of ranging areas. Also, in this calculation of quartile, there is division into a plurality of lens pulse regions, and lens pulse regions meeting specified conditions are excluded. By performing this processing it is possible to exclude lens pulse values corresponding to crossing subjects and unwanted subjects, and lens pulse values that contain a large ranging error, and it is possible to improve the accuracy of quartile calculation. Also, since quartiles can be calculated without using difficult computations, it is possible to obtain the quartiles with short time processing.

It should be noted that in the flow for statistical processing, it has been determined whether or not there are lens pulse regions to be excluded using three conditions for infinity side lens pulse regions (refer to S27, S31 and S35), but not all of these conditions need to be determined, and as long as it is possible to ensure desired accuracy some steps may be omitted, and other conditions may be added. Similarly, for the close-up end lens pulse regions also, conditions may be omitted and other conditions may be added. Also, a method for lens pulse region division is not limited to the method that was described using FIG. 6, and another method may be used.

Next, detailed operation of the focal position prediction processing of step S19 (refer to FIG. 3) will be described using the flowcharts shown in FIG. 5A and FIG. 5B. If the focal position prediction processing is commenced, it is first determined whether or not there is change in estimated subject movement (S41). Here, the focal position prediction section 37 performs determination by referencing results of subject movement estimation in step S15. For example, as was described using FIG. 12, the movement state estimating section 36b estimates movement state of the subject based on history of quartile. Therefore, in this step change in subject movement is determined based on whether or not there is change in subject movement in accordance with estimation results by the movement state estimating section 36b.

If the result of determination in step S41 is that there is change in subject movement, a number of data points for prediction is reduced (S43). Data for prediction means lens pulse value that have been acquired previously that are used for moving body prediction. In the case of performing moving body prediction, position of the focus lens (lens pulse value) where focus is achieved on a main subject at the time of actual shooting is calculated using a plurality of previous lens pulse values. Generally, it is possible to perform prediction with higher precision if a greater number of lens pulse values are used in moving body prediction. However, in a case where there is change in subject movement, lens pulse values from a long time before the current point in time are not conducive to prediction accuracy. Therefore, in step S43, the number of history data for prediction is reduced, so that lens pulse values used in prediction are only lens pulse values that were acquired close to the current time.

If the number of data points for prediction has been reduced in step S43, or if the result of determination in step S41 was that there was no change in estimated subject movement, next, the number of data for prediction is determined (S45). Here, the focal position prediction section 37 determines a number of data for prediction that will be used in moving body prediction. If the number of data points for prediction was not changed (S41 No), default values are adopted to the number of data for prediction. If the number of data points for prediction was changed in step S43, the number of data points after change is made the number of data for prediction.

Next, exclusion of data for prediction is performed (S47). Here, data that is not necessary for performing calculation of a prediction equation, namely lens pulse values that are significantly away from the prediction equation and lens pulse values that exceed a specified threshold value, from among defocus amounts (lens pulse values) of selected areas that were calculated by the first AF calculation section 35 and output from the second AF calculation section 36, are excluded.

Next, calculation is performed with a linear prediction equation (S49). Here, the focal position prediction section 37 calculates position of the focus lens (lens pulse value) at the time of actual shooting using collinear approximation, that is, using a linear prediction equation and previous defocus amounts (lens pulse values). Also, only a linear prediction equation may be calculated.

Next, calculation is performed with a quadratic prediction equation (S51). Here, the focal position prediction section 37 calculates position of the focus lens (lens pulse value) at the time of actual shooting using quadratic curve approximation, that is, using a quadratic prediction equation and previous defocus amounts (lens pulse values). Also, only a quadratic prediction equation may be calculated.

Next, it is determined whether or not reliability of the quartile is high (S53). Since reliability of quartiles is determined in step S13, determination here is based on results of that reliability determination. If the result of this determination is that reliability of the quartiles is high, it is next determined whether or not direction of estimated subject movement, and gradient of a prediction equation, are different (S55). Direction of subject movement (approaching direction or receding direction) is estimated in step S15. Also, gradient (positive/negative) of a prediction equation that has been calculated in steps S49 and S51 corresponds to subject movement direction (approaching direction/receding direction) based on the prediction equation.

If the result of determination in step S55 is that the subject movement direction and prediction equation gradient are different, a prediction equation is not used in calculation of focal position, and instead average value or current position is used as focal position (S57). If direction of subject movement that has been estimated based on quartile does not match subject movement direction derived using moving body prediction, it is determined that the accuracy of the prediction equation is low. Therefore, instead of using the prediction equation, average values of previous lens pulse values (defocus amounts), or current lens pulse value (lens pulse value that has been calculated most recently) are adopted as positions (lens pulse values) for the focus lens at the time of actual exposure. It should be noted that although it is determined whether estimated subject movement direction matches direction of movement represented by gradients of the prediction equation, comparison of absolute values, namely magnitude of subject movement and magnitude of prediction equation inclination, may also be taken into consideration.

On the other hand, if the result of determination in step S55 is that the subject movement direction and the gradient of the prediction equation are not different, and that they substantially match, it is next determined whether or not estimated subject movement is high-speed (S59). Since it is also determined in step S15 whether or not subject movement is high speed (refer to high speed movement of i or v in FIG. 12), determination is based on the result of this determination.

If the result of determination in step S59 is that the subject is moving at high speed, a quadratic prediction equation is selected (S61). If the subject is moving at high speed, prediction computation can perform prediction with good accuracy using a quadratic equation, and so a quadratic equation is selected, or the computation results of step S51 are adopted.

On the other hand, if the result of determination in step S59 is that the subject is not moving at high speed, a linear prediction equation is selected (S63). Since the subject is not moving at high speed, prediction computation can perform prediction with good accuracy using a linear equation, and so a linear prediction equation is selected, or the computation results of step S49 are adopted.

If a prediction equation has been selected in step S61 or S63, or if it was not a prediction equation in step S57 and instead average value or current position were made target focus lens position, or if the result of determination in step S53 was that reliability of quartiles was not high, focal position is determined (S65). A focus lens position that was determined in step S57 is determined to be focal position.

Alternatively, focus lens position where focus will be achieved at the time of actual shooting is calculated based on a prediction equation that was selected in steps S61 or S63, and data for prediction, and the focus lens position that has been calculated is determined to be a focal position. Also, if, in the determination of step S53 the reliability of the quartiles was not high, focus lens position is calculated using a moving body estimation computation method that would have been performed conventionally (ranging area representing the most recent defocus amount (lens pulse value) selected in a moving body prediction equation). Once focal position has been determined, the originating flow is returned to.

In this way, in the flow for focal position prediction processing, since moving body prediction is performed using subject movement that was estimated in step S15 (refer, for example, to S41, S55, and S59), it is possible to improve the accuracy of moving body estimation computation. Subject movement can be estimated based on quartiles calculated based on ranging values (lens pulse value) that have been calculated in a plurality of ranging areas.

It should be noted that in order to predict focal position, in the flow of FIG. 5A and FIG. 5B, various determinations have been performed (refer, for example, to S41, S53, S55, S59 etc.), but some of these determinations may be omitted, and other determination conditions may be added.

Figure 14:
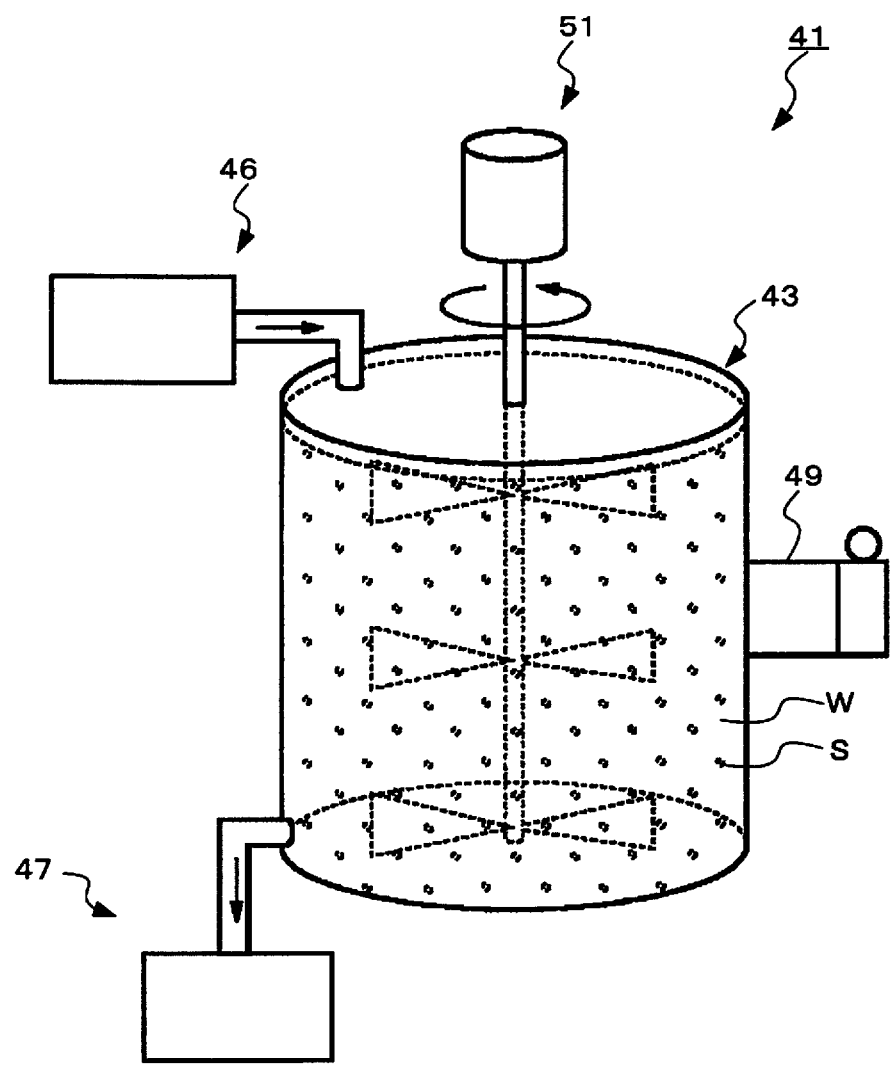
FIG. 14 is a drawing showing an example where the present invention has been applied to a cell culture device.

Next, applying of the present invention to another device will be described using FIG. 14. In FIG. 1 to FIG. 13 description was given for a case where the present invention was applied to a camera. However, the present invention is not limited to a camera and it can be applied to any device that focuses on an object that is moving. FIG. 14 shows an example of applying the present invention to an observation device that performs observation of cells that move in a floating manner, in a cultivation device that performs suspension cultivation of cells. In such a cultivation device, at the time of observing cell cultivation it is difficult to focus on cells that are moving while being suspended (for example, moving to approach in a linear direction, or in a receding direction), images are blurred, and it is difficult to appropriately perform observation.

FIG. 14 shows one example of a cell culture device 41 to which the present invention has been applied. Refer to Japanese patent laid-open No. 2020-141589 (US Patent Application Publication No. 2020/0283721) regarding the detailed structure of this cell culture device. US Patent Application Publication No. US 2020/0283721 is incorporated herein by reference. The cell culture device 41 comprises a supply section 46 that supplies a culture medium W to a culture vessel 43 that is capable of holding the culture medium W and cells S, a discharge section 47 that discharges culture medium W and cells S from the culture vessel 43, an observation section 49 that measures cell density within the culture medium W inside the culture vessel 43, an agitation mechanism 51 for agitating the culture medium W inside the culture vessel 43, and a control section (not shown) for controlling the supply section 46, discharge section 47, and observation section 49.

As the observation section 49, it is possible to adopt known technology for measuring cell density within a culture medium, for example, it is possible to adopt a structure that provides a retro reflective member having an array of a plurality of minute reflective elements arranged. This observation section 49 comprises, for example, an object lens that is arranged at the culture vessel 43 side, an imaging section that photographs illumination light that has been condensed by the object lens after having passed through the culture medium W inside the culture vessel 43, and an image analysis section for calculating cell density within the culture medium W inside the culture vessel 43 based on images that have been acquired by the imaging section.

Cells S within the culture medium W are photographed by the imaging section of this observation section 49. Cell density within the culture medium W inside the culture vessel 43 is then calculated by the image analysis section based on a number of cells S that are contained in an image that has been acquired by the imaging section. In this type of cell culture device there is a demand to not only obtain density of cells, but also acquire and store detailed images of specified cells, and create a report as observation data.

In order to observe cells with good accuracy in this cell culture device 41, it is necessary to focus on cells with high precision using the object lens, but if the cells S are moving this is not easy. Also, even if movement speed of the cells is slow, if there are objects at a comparatively close distance, the image plane movement velocity of those objects can become equal to that of a high speed object at a distance. Therefore, by executing the AF operation that was described in FIG. 3 to FIG. 13 it is possible to perform moving body prediction with cells S that are moving as a main subject, and to perform focus with good accuracy.

In this way, the focus adjustment device each of the embodiments of the present invention calculates statistical values representing dispersion in ranging values of a plurality of areas, and obtains a representative value for ranging values included in statistical values representing this dispersion. Subject movement is then estimated based on time series change in this representative value, and reflected in moving body prediction. Also, quartiles, for example, are used as statistical values representing dispersion, and representative values (refer, for example, to S11 in FIG. 3). These quartiles are calculated based on ranging values of a plurality of areas for every frame. Further, differences between respective quartiles Q1 to Q3 are calculated across frames. Subject movement is estimated based on change in quartiles Q1 to Q3 across a plurality of frames. This estimated subject movement is reflected in moving body estimation computation (order of the moving body prediction equation, history information etc.).

As has been described above, each embodiment of the present invention is provided with a plurality of detection areas in an imaging region formed by an optical system, ranging values of an object in the detection areas are detected, and focus adjustment is performed for the object. When performing this focus adjustment, statistical processing is performed on ranging values of a plurality of detection areas, representative values containing statistical dispersion are calculated based on this statistical processing (refer, for example, to S11 in FIG. 3), movement state of an object is estimated based on time series change of these representative values (refer, for example, to S15 in FIG. 3), focal position relating to the object is predicted based on this estimated movement state (refer, for example, to S19 in FIG. 3), and focus adjustment is performed based on this focal position that has been predicted. With this embodiment, statistical quartiles are applied, directed at ranging values of a plurality of ranging areas, and movement state of an object is estimated based on time series change in the quartiles, which means that it is possible to estimate movement state of the subject without being affected by dispersion such as of ranging errors etc. In this way, since it is possible to change parameters for moving body prediction based on movement state that has been estimated without being affected by disturbance, it is possible to improve the accuracy of moving body estimation computation.

It should be noted that in the embodiments of the present invention, processing has been performed mainly using a target lens pulse position (lens pulse value). However, since it is possible to mutually interchange target lens pulse position (lens pulse value) and defocus amount, processing may also be appropriately performed using defocus amount.

Also, with the one embodiment of the present invention, the face detection section 22*a* and tracking section 22*b* within the image processing section 22 respectively have a face detection circuit and a tracking circuit, but instead of hardware circuits they may also be configured as software using a CPU and programs, may be implemented by hardware circuits such as gate circuits that are generated based on a programming language described using Verilog, or may be configured using a DSP (Digital Signal Processor). These sections and functions may also be respective circuit sections of a processor constructed using integrated circuits such as an FPGA (Field Programmable Gate Array). Suitable combinations of these approaches may also be used. The use of a CPU is also not limiting as long as a processor fulfills a function as a controller.

Also, regarding each of the sections with the AF calculation section 23, besides being constructed in the form of software using a CPU and programs, some or all of these sections may be constructed with hardware circuits, or may have a hardware structure such as gate circuitry generated based on a programming language described using Verilog, or may use a hardware structure that uses software, such as a DSP (digital signal processor). These sections and functions may also be respective circuit sections of a processor constructed using integrated circuits such as an FPGA (Field Programmable Gate Array). Suitable combinations of these approaches may also be used. In cases where calculation of defocus amount, reliability evaluation, calculation of contrast evaluation values, and generation of phase difference pixels etc. are often performed by repeating uniform computational processing, these operations may also be configured using hardware circuits. Also, a CPU has been used as a controller, but the present invention is not limited to a CPU as long as elements fulfill a function as a controller.

Also, with the one embodiment of the present invention, a device for taking pictures has been described using a digital camera, but as a camera it is also possible to use a digital single lens reflex camera, a mirrorless camera, or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a medical camera (for example, a medical endoscope), or a microscope, an industrial endoscope, a camera for mounting on a vehicle, a surveillance camera etc. In any event, it is possible to apply the present invention to any device that repeatedly generates ranging values of an object in a plurality of detection areas, and performs focus adjustment for an object based on ranging values.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment device, that provides a plurality of detection areas in an imaging region formed by an optical system, repeatedly generates ranging values for a physical object in the detection areas, and performs focus adjustment for the physical object based on the ranging values, comprising
a processor that has a statistical processing section, a movement state estimating section, a prediction section, and a control section, wherein
the statistical processing section subjects ranging values of the plurality of detection areas to statistical processing;
the movement state estimating section calculates representative values that contain statistical dispersion based on the statistical processing, and estimates movement state of the physical object based on time-series change in the representative values;
the prediction section predicts focal position regarding the physical object based on the movement state that has been estimated; and
the control section performs focus adjustment based on the focal position that has been predicted,
wherein the statistical processing section applies quartiles as the statistical processing, and
wherein the movement state estimating section includes an interquartile range as the representative values, determines reliability based on time series change of an interquartile range, and if it is determined that there is reliability estimates and outputs movement state of the physical object.

2. The focus adjustment device of claim 1, wherein:
the movement state estimating section estimates movement direction of the physical object based on time-series change in the representative values.

3. The focus adjustment device of claim 1, wherein:
the movement state estimating section estimates movement speed of the physical object based on time-series change in the representative values.

4. The focus adjustment device of claim 1, wherein:
the statistical processing section calculates deviation and/or average values.

5. The focus adjustment device of claim 4, wherein:
the representative values contain the average value and the deviation.

6. The focus adjustment device of claim 4, wherein:
the movement state estimating section determines reliability based on time series change of the representative values, and if it is determined that there is reliability estimates and outputs movement state of the physical object.

7. The focus adjustment device of claim 1, wherein: the movement state estimating section makes the representative values a first quartile, or a second quartile, or a third quartile.

8. The focus adjustment device of claim 1, wherein:
the movement state estimating section determines reliability based on degree of dispersion of the interquartile range, and/or size of the interquartile range, and or number of the ranging values that are valid contained in the interquartile range.

9. A focus adjustment method, that provides a plurality of detection areas in an imaging region formed by an optical system, detects ranging values for a physical object in the detection areas, and performs focus adjustment for the physical object, comprising:
subjecting ranging values of the plurality of detection areas to statistical processing;
calculating representative values that contain statistical dispersion based on the statistical processing, and estimating movement state of the physical object based on time-series change in the representative values;
predicting focal position regarding the physical object based on the movement state that has been estimated;
performing focus adjustment based on the focal position that has been predicted;
in the statistical processing, applying quartiles; and
in estimation of the movement state, determining reliability based on time series change of an interquartile range, and if it is determined that there is reliability, estimating and outputting movement state of the physical object.

10. The focus adjustment method of claim 9, further comprising:
in estimating the movement state, estimating movement direction of the physical object based on time-series change in the representative values.

11. The focus adjustment method of claim 9, further comprising:
in estimating the movement state, estimating movement speed of the physical object based on time-series change in the representative values.

12. The focus adjustment method of claim 9, further comprising:
in the statistical processing, calculating deviation and/or average values.

13. The focus adjustment method of claim 12, wherein:
the representative values contain the average value and the deviation.

14. The focus adjustment method of claim 12, wherein:
in estimation of the movement state, determining reliability based on time series change of the representative values, and if it is determined that there is reliability estimating and outputting movement state of the physical object.

15. The focus adjustment method of claim 9, further comprising:
in the movement state estimation, making the representative values a first quartile, or a second quartile, or a third quartile.

16. A non-transitory computer-readable medium storing a processor executable code, which when executed by at least one processor, the processor being arranged in a focus adjustment device that is provided with a plurality of detection areas using an imaging region formed by an optical system, and that detects ranging value of a physical object in the detection areas, performs a focus adjustment, the focus adjustment method comprising:
subjecting ranging values of the plurality of detection areas to statistical processing;
calculating representative values that contain statistical dispersion based on the statistical processing, and estimating movement state of the physical object based on time-series change in the representative values;
predicting focal position regarding the physical object based on the movement state that has been estimated;
performing focus adjustment based on the focal position that has been predicted;
in the statistical processing, applying quartiles; and
in estimation of the movement state, determining reliability based on time series change of an interquartile range, and if it is determined that there is reliability, estimating and outputting movement state of the physical object.

17. The focus adjustment method of claim 9, further comprising:
determining reliability based on degree of dispersion of the interquartile range, and/or size of the interquartile range, and or number of the ranging values that are valid contained in the interquartile range.

* * * * *